United States Patent
Nicolson et al.

(10) Patent No.: US 8,108,689 B2
(45) Date of Patent: Jan. 31, 2012

(54) OBFUSCATION EVALUATION METHOD AND OBFUSCATION METHOD

(75) Inventors: Kenneth Alexander Nicolson, Hyogo (JP); Rieko Asai, Osaka (JP); Taichi Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 840 days.

(21) Appl. No.: 12/091,224

(22) PCT Filed: Oct. 27, 2006

(86) PCT No.: PCT/JP2006/322039
§ 371 (c)(1),
(2), (4) Date: Apr. 23, 2008

(87) PCT Pub. No.: WO2007/049817
PCT Pub. Date: May 3, 2007

(65) Prior Publication Data
US 2009/0119515 A1 May 7, 2009

(30) Foreign Application Priority Data

Oct. 28, 2005 (JP) .................................. 2005-315472

(51) Int. Cl.
*G06F 21/00* (2006.01)

(52) U.S. Cl. ............ 713/190; 713/193; 726/22; 726/26; 717/127; 717/141; 717/159

(58) Field of Classification Search .................. None
See application file for complete search history.

(56) References Cited

U.S. PATENT DOCUMENTS

| | | | |
|---|---|---|---|
| 5,950,003 A * | 9/1999 | Kaneshiro et al. | 717/130 |
| 6,594,761 B1 | 7/2003 | Chow et al. | |
| 6,643,775 B1 | 11/2003 | Granger et al. | |
| 6,668,325 B1 * | 12/2003 | Collberg et al. | 713/194 |
| 6,779,114 B1 | 8/2004 | Gu et al. | |
| 7,383,443 B2 * | 6/2008 | Zeman et al. | 713/190 |

FOREIGN PATENT DOCUMENTS

| | | |
|---|---|---|
| JP | 2002-514333 | 5/2002 |
| JP | 2004-272814 | 9/2004 |

OTHER PUBLICATIONS

Collberg et al "Manufacturing Cheap, Resilient, and Stealthy Opaque constructs", Jan 19-21, 1998, pp. 184-196.*
International Search Report issued Jan. 31, 2007 in the International (PCT) Application of which the present application is the U.S. National Stage.
Written Opinion of the International Searching Authority issued Jan. 31, 2007 in the International (PCT) Application of which the present application is the U.S. National Stage.

(Continued)

*Primary Examiner* — Nasser Goodarzi
*Assistant Examiner* — Fikremariam A Yalew
(74) *Attorney, Agent, or Firm* — Wenderoth, Lind & Ponack, L.L.P.

(57) ABSTRACT

An obfuscation evaluation method which sufficiently evaluates an obfuscation performed on a program. The obfuscation evaluation method includes: a step of executing an obfuscated code module produced by obfuscating an original code module of a program, and generating a trace output file by logging a result of the execution; and a step of identifying the degree of obfuscation of the obfuscated code module by evaluating the trace output file.

17 Claims, 12 Drawing Sheets

OTHER PUBLICATIONS

Christian Collberg et al., "Manufacturing Cheap, Resilient, and Stealthy Opaque Constructs," Conference Record of Popl '98 : the 25th ACM Sigplan-Sigact Symposium on Principles of Programming Languages, San Diego, CA, Jan. 1998, Annual ACM Sigplan-Sigact Symposium on Principles of Programming Language, NY : ACM, US, pp. 184-196.

Steven S. Muchnick, Control-Flow Analysis, "Advanced Compiler Design & Implementation," 1997 by Academic Press, pp. 169-173.

Cloakware Security Suite, "Software protection and anti-tamper solutions for hostile environments", Cloakware/Transcoder™, The Core of Cloakware Code Protection™ (Cloakware product overview advertising material), date unknown(@cloakware 2006).

Add Tracer, Jun. 7, 2006 (http://se.aist-nara.ac.jp/addtracer/), NAIST Software Engineering Lab.

Bochs think inside the bochs, Aug. 27, 2006 (http://bochs.sourceforge.net).

Intro to Virtualization, Virtual Machine, Server Consolidation—Vmware (http://www.vmware.com/), available since at least Aug. 25, 2006.

Haruaki Tamada et al., "Injecting Tracers into Java Class Files for Dynamic Analysis," Proc. $46^{th}$ Programming Symposium, Jan. 2005, pp. 51-62 (and its English translation).

Thomas Ball et al., "Efficient Path Profiling," Proc. Of Micro 96, Dec. 1996, pp. 46-57.

Donald Knuth, "The Art of Computer Programming, vol. 2: Seminumerical Algorithms," Addison-Wesley Series in Computer Science and Information Processing, 1969, Addison-Wesley, pp. 38-63.

V. I. Levenshtein, "Binary codes capable of correcting spurious insertions and deletions of ones," Russian Problemy Peredachi Informatsii 1; Jan. 1965, pp. 12-25, <corresponds to http://en.wikipedia.org/wiki/Levenshtein_distance/ and http://www.nist.gov/dads/HTML/Levenshtein.html>.

* cited by examiner

Before:
```
//**Block(A)
i += 2;
```
200

Obfuscation

After: 204
```
//**Block(A0)
r = rand_func( ... );
if ( r <= 0.333 )
{
//**Block(A1)
   i = increment( i );
   i = increment( i );
}
else if ( r <= 0.666 )
{
//**Block(A2)
   i += 3;
   --i;
}
else if ( r <= 1.0 )
{
//**Block(A3)
   i++;
   ++i;
}
else
{
//**Block(A4)
   i += *global_pointer;
}
```

FIG. 9

Block mapping report for:
Block(A) => Blocks(A0+(A1 | A2 | A3 | A4))
Obfuscation method: Random branching
Dummy: Blocks(A4)
— 210

FIG. 10

Comparator report for:
Block(A) => Blocks(A0+(A1 | A2 | A3 | A4))
Obfuscation method: Random branching
Number of executions: 300
Execution path coverage:
A0+A1:5%
A0+A2:82%
A0+A3:13%
Dummy Path A0+A4:0%
Quality: 10%
— 208

FIG. 11

Block(A):
Random branching=> Blocks(A0,A1,A2,A3,A4)
Block coverage:
A0:300
A1:15
A2:246
A3:39
A4:0
Quality: Fail
— 418

OBFUSCATION EVALUATION METHOD AND OBFUSCATION METHOD

TECHNICAL FIELD

The present invention relates to a method for evaluating obfuscation performed on a program and a method for obfuscating a program.

BACKGROUND ART

Software applications (hereafter, referred to simply as "applications") often contain certain features that are critical in ensuring that the application can be deployed and used according to the developer's business plans. For instance, for many years dongle-like devices have been used to attempt to enforce software licensing schemes, and recently software-based digital rights management (DRM) schemes have been used to attempt to ensure digital contents such as music, video, and written words are experienced by the consumer according to the contents licensing schemes. To ensure that the algorithms that implement these features are robust against attacks from hackers, a number of methods of code obfuscation, or in other words, rewriting code so that it is difficult to understand and alter, have been proposed and many made into commercial products.

Current obfuscation methodologies have varying degrees of theoretical basis behind their design. Unfortunately, however good these theoretical analyses may appear to be on paper, when applied in the real world the actual result may be lacking. Even if the application is accurate, due to the static nature of applying the obfuscation to source code or object code, the effect of the obfuscation when run under real conditions may be unpredictable. Finally, even if the developer manages to detect a failure in the theory or the application of obfuscation, there may be no easy way to try to correct this problem. In a world where Java™ byte code can be traced by programs like AddTracer, or where machine code run in a virtual in-circuit emulator environment through free programs like Bochs or commercial solutions like VMware™, the threat to code from dynamic analysis-based reverse engineering is constantly increasing.

Existing obfuscation methods such as those disclosed in U.S. Pat. Nos. 6,594,761 and 6,779,114 by Chow et al. or in U.S. Pat. No. 6,668,325 by Collberg et al. for control flow reorganisation have little or no quality control methods barring rough parameters for selecting the degree of obfuscation required; the developer has to trust that the transformation process was reliable, or measure the resulting obfuscated module in its entirety and try to estimate if it meets the desired performance or other requirements. U.S. Pat. No. 6,668,325, however, did try to address this problem, but only in a limited way, by profiling the original code to identify such things as hot spots (places where optimization is desirable) so as to direct the obfuscation process towards the key areas of the pre-obfuscated code module. However, the strength of the obfuscations applied is evaluated merely according to pre-determined heuristics, not in relation to the final output code, so only the theoretical strength is used as a measure.

Even if the developer manages to detect that the obfuscation to be not as good as desired, there is no easy or automatic way to repeat the obfuscation taking into account the weaknesses discovered; the developer must just tweak the parameters and hope something better comes out the other end. This manual tuning method can be potentially very time-consuming as the developer can only very roughly guide the obfuscation process towards its goal, often discarding useful obfuscations along with the underperforming transformations.

For example, the following documents disclose prior art in the field of obfuscation and fundamental techniques used in the present invention:

Non-Patent Reference 1: Muchnick, Steven S. *Advanced Compiler Design & Implementation.* 1997: Academic Press.

Non-Patent Reference 2: *Cloakware/Transcoder™: The core of Cloakware Code Protection™* (Cloakware product overview advertising material). Date unknown.

Non-Patent Reference 3: AddTracer (http://se.aist-nara.ac.jp/addtracer/)

Non-Patent Reference 4: Bochs (http://bochs.sourceforge.net)

Non-Patent Reference 5: VMware (http://www.vmware.com/)

Non-Patent Reference 6: Tamada, Haruaki; Monden, Akito; Nakamura, Masahide; and Matsumoto, Ken-ichi. *Injecting Tracers into Java Class Files for Dynamic Analysis.* Proc. 46th Programming Symposium, January 2005, pp. 51-62.

Non-Patent Reference 7: Ball, T., and Larus, J. R. *Efficient path profiling.* Proc. of Micro 96, December 1996, pages 46-57.

Non-Patent Reference 8: Knuth, Donald. *The Art of Computer Programming, Volume 2: Seminumerical Algorithms.* 1969: Addison-Wesley.

Non-Patent Reference 9: Levenshtein, V. I. "Binary codes capable of correcting spurious insertions and deletions of ones" (original in Russian). *Russian Problemy Peredachi Informatsii* 1; Jan. 1965, 12-25.

Patent Reference 1: U.S. Pat. No. 6,594,761 (Chow et al.)
Patent Reference 2: U.S. Pat. No. 6,668,325 (Collberg et al.)
Patent Reference 3: U.S. Pat. No. 6,779,114 (Chow et al.)

FIG. 1 is a diagram that illustrates an aspect of the prior art, which is an obfuscation method as described by Tamada et al. in their paper *Injecting Tracers into Java Class Files for Dynamic Analysis.* An original code module 100 may be linked with a logging library 102 to produce a trace output file 104 that documents how the program (the original code module 100) ran. Similarly, after processing by the obfuscator 106, the obfuscated code module 108 may be linked with a logging library 110 to produce a trace output file 112 that documents how the obfuscated program (the obfuscated code module 108) ran. The trace output file 112 is used in reverse engineering.

FIG. 2 is a diagram that illustrates another aspect of the prior art, which is an obfuscation method suggested by Collberg in U.S. Pat. No. 6,668,325. Here, an original code module 150 may be linked with a logging library 152 (specifically for profiling) to produce a trace output file 154 that documents how the program (the original code module 150) ran. This trace output file 154 feeds into the obfuscation process of an obfuscator 156 in order to try to create a better obfuscated code module 158.

However, the prior art does not attempt to analyse the obfuscated code module 158 to analyse the quality of the actual transformation; the only metrics specified are theoretical evaluations of the complexity of transformations. So, it can be seen that both these objects of prior art have serious weaknesses.

FIG. 3 is a flowchart representing the obfuscation method described by Cloakware. Here, the obfuscation method starts at S300, and proceeds to the selection of parameters (S302). These parameters are used to obfuscate the original code module (S304). Evaluation of performance (S306) is a rough empirical process, largely based on the crude size and performance of the obfuscated code module as a whole. If it is found not to be good enough (No in S308), then selection of "better" parameters (S312) selects a different set of values (for example, if the obfuscated code module was too large, then a smaller size may be selected) for the obfuscation process (S304), and the loop continues; otherwise, the process finishes (S310).

However, the prior art does not suggest any detailed means of selecting better parameters, and subsequent iterations of the obfuscation process (S304) start again from scratch, discarding both effective and ineffective obfuscations. This may be described as a "black box obfuscation process"; that is, the mechanisms of the obfuscation process are hidden away from the other components of the system. Conversely, the "white box obfuscation process" proposed in the present invention, in which certain details of the obfuscation process are exposed and available to fine tuning, can produce superior results.

FIG. 4 is a flowchart that illustrates the obfuscation method indicated in FIG. 2. Here, the obfuscation method starts (S350) and proceeds to compile an original code module with a logging library (S352), much as suggested by the Tamada et al. paper. Run program (original code module) with data sets (S356) uses data sets 354 to produce a trace output file 358 describing the performance of the original code module. Set obfuscation limits of space, performance, and the like (S360) specifies the metrics that will determine when the code is sufficiently obfuscated. However, these metrics are either very crude code size measures or else measures of the theoretical complexity of certain obfuscation techniques.

Next, select part to obfuscate (S362) chooses which portion (basic block, module, or other sub-division of the original code module 150) should next be optimised, and how it should be optimised, based on various heuristics including hints from the trace output file 358 as to which portions of the original code module 150 are important. Obfuscate part (S364) performs the required transformation on the chosen portion, then sufficiently obfuscated (S366) tests the obfuscation metrics limits set in S360 to see if the iteration should either terminate at S368, or loop back round to select another part to obfuscate S362. However, the prior art does not suggest any means for testing the output obfuscated code module (the obfuscated code module 158 as shown in FIG. 2), leaving such issues as measuring the actual performance of the obfuscated code module 158 with real data sets unaddressed.

The conventional obfuscation evaluation methods as mentioned above evaluate the obfuscation based on the obfuscated code module. Moreover, in the abovementioned conventional obfuscation methods, obfuscation is performed on the original code module based upon theoretical obfuscation methods, or based upon a static target value (code size, and the like).

However, with the abovementioned conventional obfuscation evaluation methods, evaluation of the obfuscation is based only on the obfuscated code module and is performed statically; this means that evaluation is performed to an insufficient degree.

In addition, with the abovementioned conventional obfuscation method, dynamic obfuscation is not performed to a sufficient degree; in other words, the obfuscation is insufficient, and therefore the obfuscated code module is left open to attacks from hackers.

Having been conceived in light of the aforementioned problems, an object of the present invention is to provide an obfuscation evaluation method, in which the obfuscation is evaluated to a sufficient degree, and an obfuscation method, whereby hackers and the like can be prevented from reading the program in question.

SUMMARY OF THE INVENTION

To achieve the aforementioned object, the obfuscation evaluation method of the present invention evaluates an obfuscation performed on a program, and includes: a first execution step of executing an obfuscated code generated by obfuscating original code of a program; a first logging step of generating first logging data by logging execution details of the first execution step; and an evaluation step of evaluating the first logging data, thereby identifying the degree of obfuscation of the obfuscated code. For example, in the evaluation step, a numerical value, which is an indicator of the degree of obfuscation, is calculated as a metric, based on the first logging data.

According to this aspect of the present invention, the extent to which a code is obfuscated is quantified based on the details of the obfuscated code being executed, or in other words, based on dynamic analysis feedback, and thus it is possible to sufficiently evaluate the obfuscation.

In addition, the obfuscation evaluation method may further include a second execution step of executing the original code, and a second logging step of generating second logging data by logging execution details of the second execution step; in the evaluation step, the first logging data is compared with the second logging data and evaluated based on the comparison. For example, in the evaluation step, the ratio between the number of executed paths indicated in the first logging data and the number of executed paths indicated in the second logging data is calculated as the metric. Alternatively, in the evaluation step, the degree to which the first logging data and the second logging data resemble one another is expressed as a Levenshtein distance.

According to this aspect of the present invention, the extent of the obfuscation is quantified by comparing the execution details of the original code to those of the obfuscated code, and thus it is possible to sufficiently evaluate the obfuscation.

Moreover, in the evaluation step, a frequency distribution of executed paths within the path coverage according to the first logging data may be calculated as the metric. For example, in the evaluation step, a chi-square result of an Equidistribution Test of path coverage is calculated as the metric. Alternatively, in the evaluation step, a chi-square result of a Poker Test of path coverage is calculated as the metric.

According to this aspect of the present invention, it is possible to sufficiently evaluate the obfuscation from the standpoint of path coverage distribution.

Furthermore, the obfuscation method according to the present invention obfuscates a program, and includes: an obfuscation step of generating an obfuscated code by obfuscating the original code of a program; a first execution step of executing the obfuscated code generated in the obfuscation step; a first logging step of generating first logging data by logging execution details of the first execution step; an evaluation step of evaluating the first logging data, thereby identifying the degree of obfuscation of the obfuscated code; and a re-obfuscation step of re-obfuscating the original code based on a result of the evaluation performed in the evaluation step. For example, in the evaluation step, a numerical value, which is an indicator of the degree of obfuscation, is calculated as a metric, based on the first logging data.

According to this aspect of the present invention, the extent to which a code is obfuscated is identified based on the details of the obfuscated code being executed, or in other words, based on dynamic analysis feedback, and thus it is possible to sufficiently evaluate the obfuscation. Furthermore, by once again obfuscating the original code based on the evaluation results, or in other words, by producing feedback based on dynamic analysis, the quality of the obfuscation can be improved. As a result, hackers and the like can be prevented from deciphering the program in question.

In addition, the obfuscation method may further include a second execution step of executing the original code, and a second logging step of generating second logging data by logging execution details of the second execution step; in the evaluation step, the first logging data is compared with the second logging data and evaluated.

According to this aspect of the present invention, the extent to which the obfuscated code has been obfuscated is identified by comparing the execution details of the original code to those of the obfuscated code, and thus it is possible to more completely evaluate the obfuscation. As a result, the quality of the obfuscation can be improved.

In addition, the obfuscation method may further include a metric judgment step of judging whether or not the metric calculated in the evaluation step is within a permissible range; each time the metric is judged as not being within the permissible range in the metric judgment step, a new obfuscated code is generated by re-obfuscating the original code in the re-obfuscation step, and the first execution step, the first logging step, the evaluation step, and the metric judgment step are repeated for the new obfuscated code; and when the metric is judged as being within the permissible range in the metric judgment step, the original code is not re-obfuscated in the re-obfuscation step.

According to this aspect of the present invention, obfuscation of the original code based on the execution details is repeated until the metrics fall within a permissible range, which makes it possible to improve the quality of the obfuscation.

In addition, the obfuscation method may further include a number judgment step of judging whether or not the number of times obfuscation has been performed on the original code has exceeded a pre-set number of times; each time it is judged that the pre-set number of times has not been exceeded in the number judgment step, a new obfuscated code is generated by re-obfuscating the original code in the re-obfuscation step, and the first execution step, the first logging step, the evaluation step, and the number judgment step are repeated for the new obfuscated code; and when it is judged that the pre-set number of times has been exceeded in the number judgment step, the original code is not re-obfuscated in the re-obfuscation step. Alternatively, the obfuscation method may further include a time judgment step of judging whether or not the amount of time required for performing obfuscation on the original code has exceeded a pre-set amount of time; each time it is judged that the pre-set amount of time has not been exceeded in the time judgment step, a new obfuscated code is generated by re-obfuscating the original code in the re-obfuscation step, and the first execution step, the first logging step, the evaluation step, and the time judgment step are repeated for the new obfuscated code; and when it is judged that the pre-set amount of time has been exceeded in the time judgment step, the original code is not re-obfuscated in the re-obfuscation step.

According to this aspect of the present invention, obfuscation of the original code based on the execution details is repeated a specified number of times, within a specified range of time, and so on, which makes it possible to improve the quality of the obfuscation. Furthermore, it becomes possible to select the obfuscated code with the highest quality obfuscation from among the obfuscated codes that have been produced through the repetitions.

In addition, part of the original code may be selectively obfuscated in at least one of the obfuscation step and the re-obfuscation step.

According to this aspect of the present invention, it is possible to perform high-quality obfuscation on important portions of the original code.

In such a manner, the present invention makes it possible to quantify how effective the obfuscating transformations have actually been in relation to given problem sets.

Furthermore, the present invention makes it possible to take that quantification and use it to feed back to the obfuscation process, enabling an obfuscating transformation to be re-applied, but with tuned parameters reflecting any issues detected when evaluating a previous obfuscation of the same original code module.

The background art does not suggest any way to try to quantify the quality of an obfuscation in relation to the observed execution path of the obfuscated code. Furthermore, the idea of feedback to the obfuscation process has never been disclosed by the background art.

The quality of an obfuscation is measured by metrics, and by examining these metrics in isolation, or by comparing these metrics with the corresponding metrics for the program before obfuscation, the effectiveness of an obfuscating transformation can be observed.

A primary means for performing metrics analysis is to study the execution paths through the control flow graph. The control flow graph is a standard representation of the structure of code, and is described in detail in many standard reference books, such as in Chapter 7 of *Advanced Compiler Design and Implementation* by Steven S. Muchnick.

Feedback to the obfuscation process means having an obfuscation process that is designed to execute a number of times, taking not only a static set of input parameters, but also having a second dynamic set of inputs based on the performance of a previous execution of the obfuscation process. Thus the obfuscation process can be directed to tune up certain aspects of the obfuscation based on metrics calculated from a previous obfuscation. The tuning up process can include, but is not limited to: performing more obfuscation on a portion of the module in order to increase security; performing less obfuscation on a portion of the module in order to improve performance; or performing an alternative obfuscation method on a portion of the module to increase diversity.

Therefore, there is an unmet need for, and it would be highly useful to have, a system and method that can evaluate the quality of an obfuscation, or more specifically, a control flow graph obfuscation that replaces original code with obfuscated code that implements a more complex control flow, containing dummy code (that is, code that is never executed), fake-robust dummy code (code that is never executed but nonetheless appears to be valid), and clones of active code with different obfuscations, then feedback to the obfuscation process the results of this evaluation to enable the obfuscation process to produce more suitable results. The design of such a feedback system should be performed in a generic manner so that can be applied to any suitable existing or new obfuscation technique.

In the present invention, evaluation of the transformation process is performed by executing the original code and the obfuscated code with execution tracing functions in place, to produce detailed logs of the control flow before and after transformation.

Also, in the present invention, the original code has logging statements inserted to enable the program flow through the control graph to be recorded.

In addition, in the present invention, the obfuscation process also produces a mapping of the fundamental blocks indicated in the original logging statements to the new fundamental blocks in the obfuscated code, enabling the obfuscated code's execution tracing logging statements to be cross-referenced with the original code's log.

Furthermore, in the present invention, an analysis tool takes the two code modules and their respective output logs and analyses the degree of similarity between these output logs to report on the quality of the obfuscation.

Also, in the present invention, the report on the quality of the obfuscation is used as another input to the obfuscation process to fine-tune the obfuscation process to address perceived weaknesses in the previous transformation.

It should be noted that the present invention can be implemented not only as the aforementioned obfuscation evaluation and obfuscation methods, but also as obfuscation evaluation apparatuses and obfuscators or integrated circuits that perform evaluation or obfuscation using these methods; as a program that causes a computer to execute evaluation or obfuscation using these methods; and as a storage medium in which the program is stored.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 9 is a diagram that shows an example of a block mapping report in the preferred embodiment;

FIG. 10 is a diagram that shows an example of a metrics report in the preferred embodiment;

FIG. 11 is a diagram that shows an example of a result record in the preferred embodiment;

DETAILED DESCRIPTION OF THE INVENTION

Figure 1:
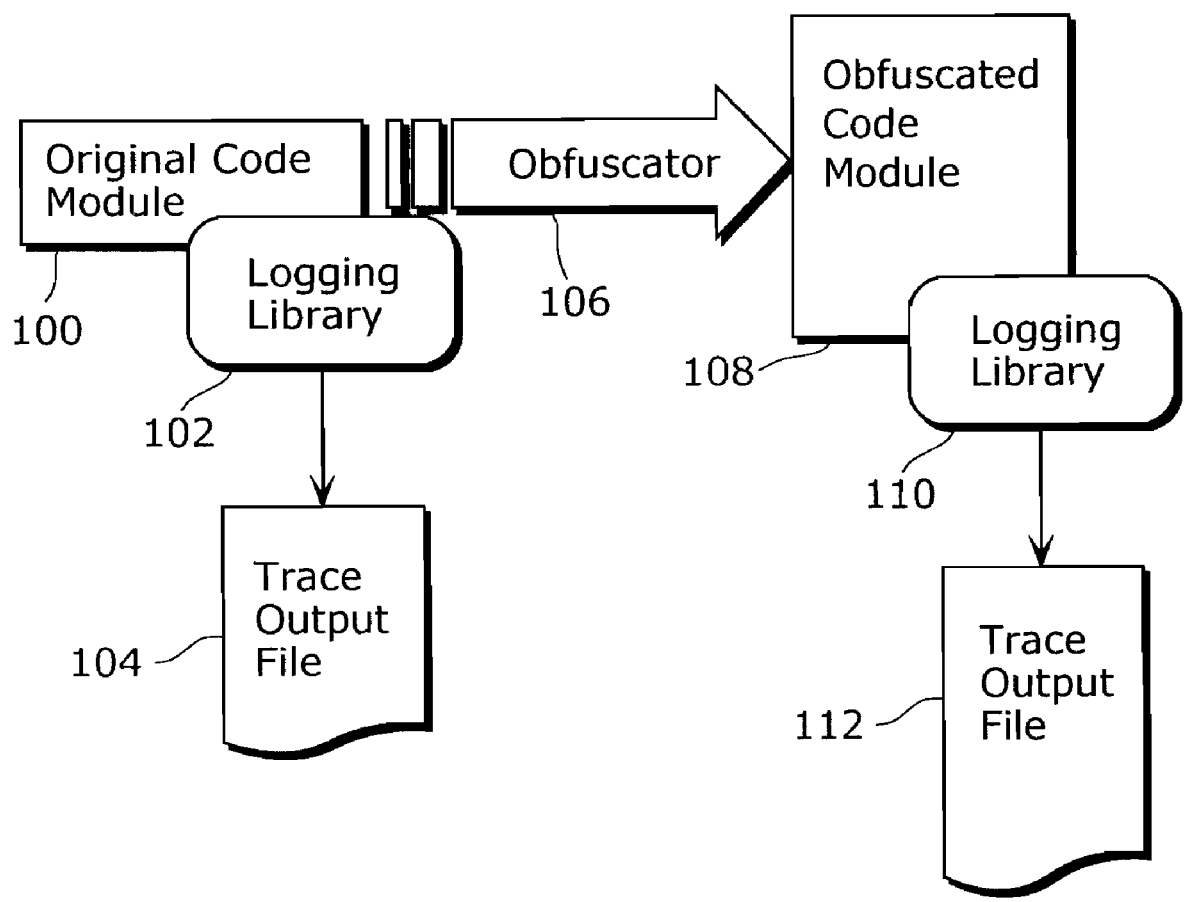
FIG. 1 is a diagram that illustrates a conventional obfuscation method.
Figure 2:
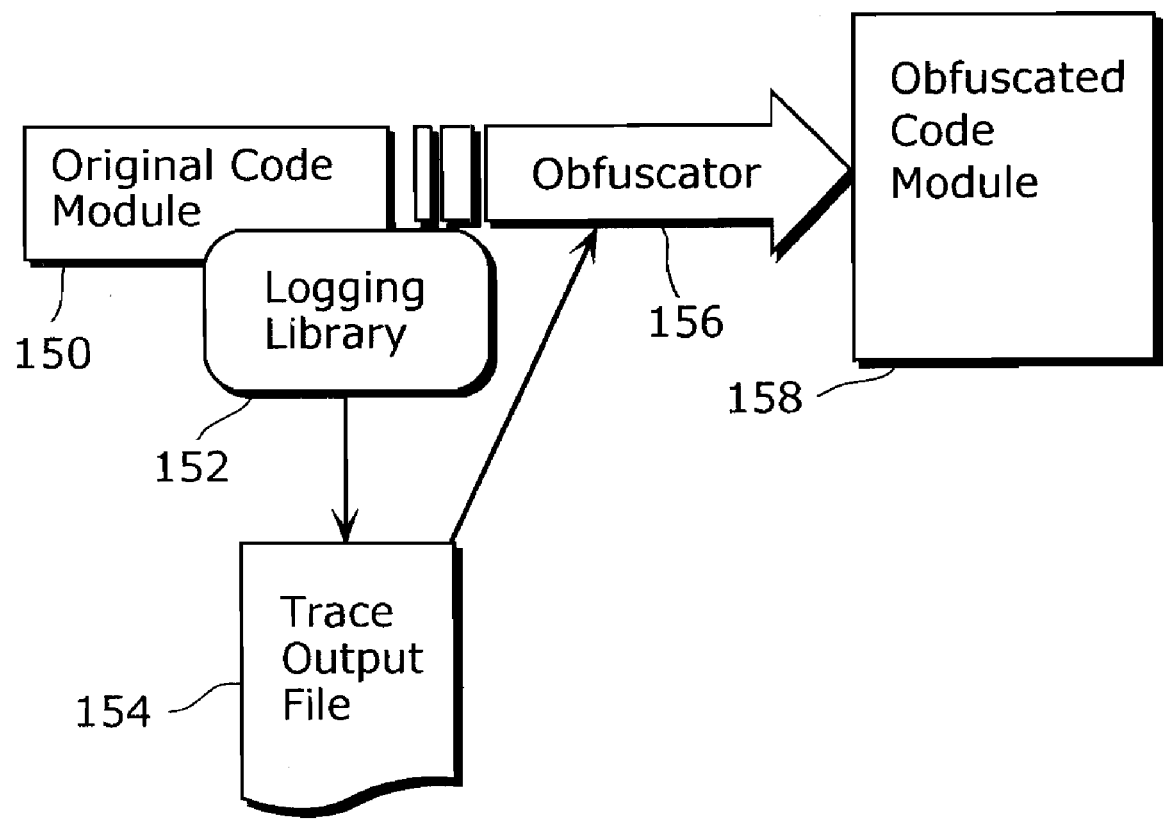
FIG. 2 is a diagram that illustrates another conventional obfuscation method.
Figure 3:
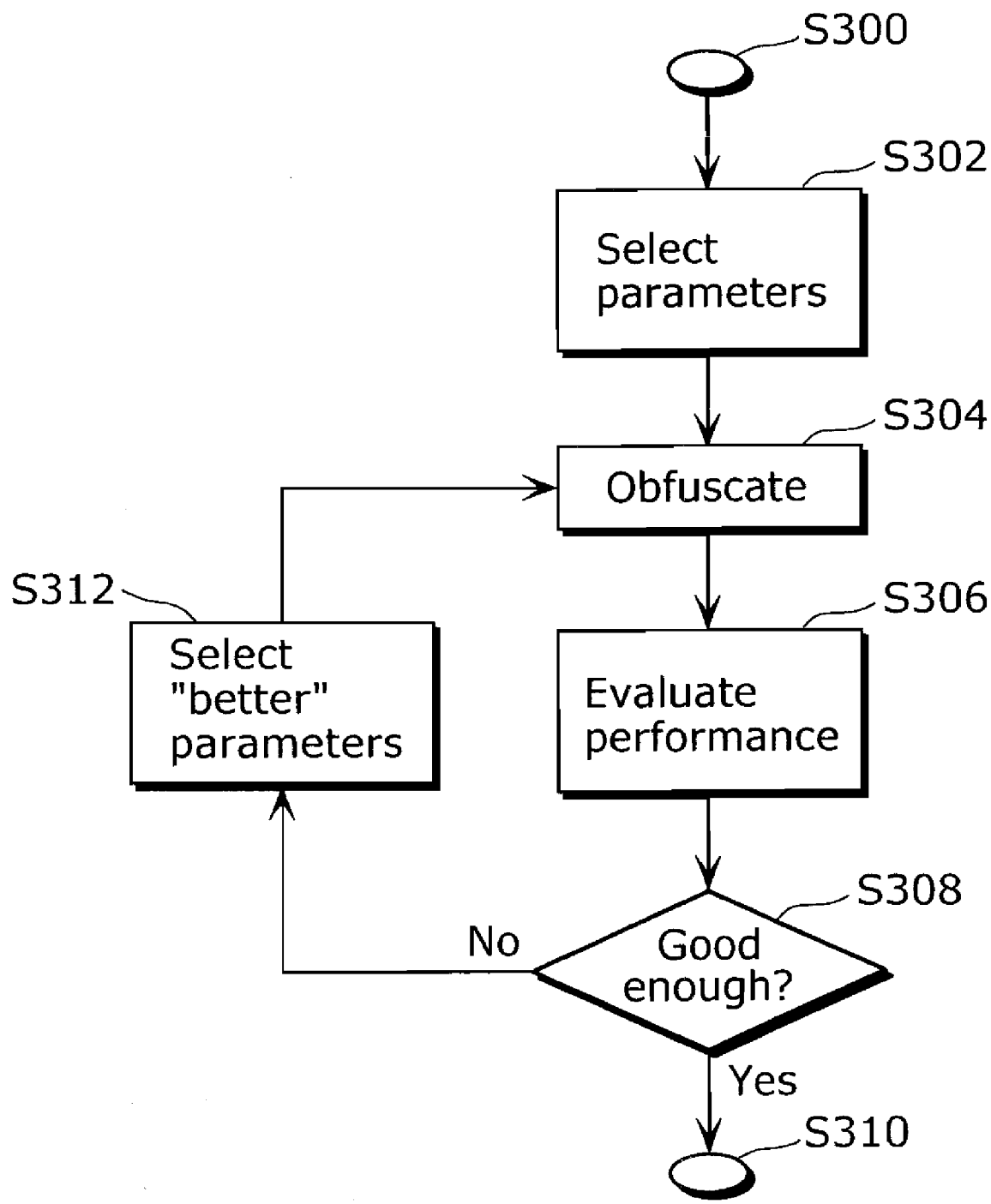
FIG. 3 is a flowchart that represents yet another conventional obfuscation method.
Figure 4:
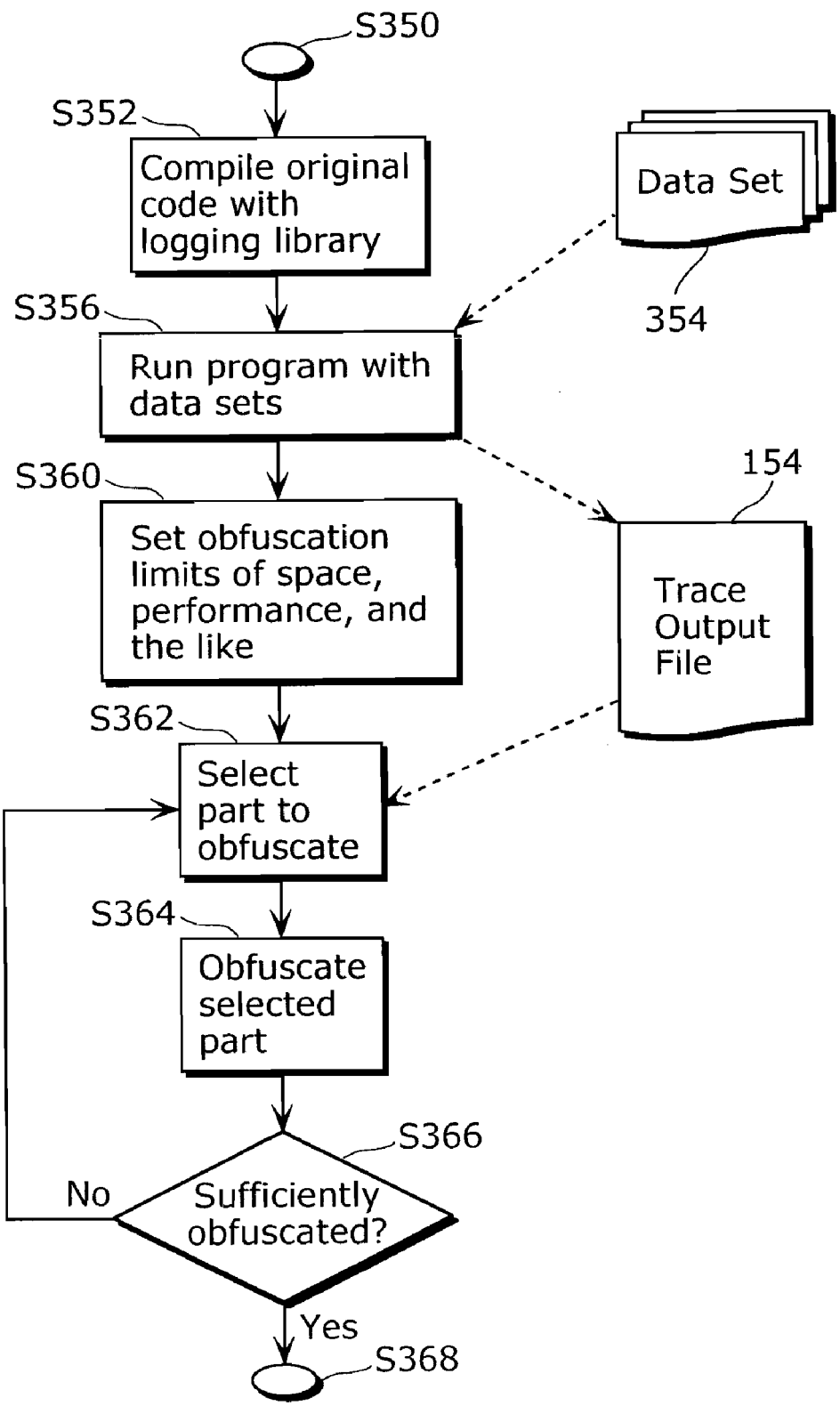
FIG. 4 is a flowchart that represents the obfuscation method illustrated in FIG. 2.

First, terminology used to describe the preferred embodiment of the present invention shall be explained. As used hereinafter, the following terms have the following meanings, except when specifically indicated otherwise.

The term "metrics" refers to values that express the degree to which the examined code satisfies some evaluation criterion. For example, one popular metric for measuring source code is lines per function. The number in isolation does not mean much, but when comparing two functions, an evaluation criterion might be "the lower the metric, the better from the standpoint of ease of maintenance."

The term "fundamental block" refers to a collection of one or more executable statements that correspond to lines of code within the original module. In the preferred embodiment each fundamental block represents one basic block as defined, for instance, by Aho, Sethi and Ullman in their book *Compilers: Principles, Techniques and Tools International Edition*, chapter 9.4, page 528; however, larger or smaller-grained blocks, or even disjoint groupings of lines of code, may be used as necessary.

The term "obfuscation," or "obfuscating transformation," refers to transforming program code in order to hide the original intent of the code by, for example, increasing complexity. Obfuscations may be measured by analysing the metrics of the obfuscated code, or the original and obfuscated program together, to obtain an understanding of the complexity and so on of the transformed code.

The term "fundamental block transformation" refers to how one or more fundamental blocks in the original code module have been transformed into one or more fundamental blocks in the obfuscated code module by the obfuscator.

The term "corresponding fundamental blocks" follows on partially from the previous definition; one use of the term describes one or more fundamental blocks in the original module and the corresponding obfuscated blocks in the obfuscated module. The other use of the term is for describing two sets of one or more fundamental blocks in the obfuscated module that both have the identical corresponding fundamental blocks in the original code. The two sets may have one or more fundamental blocks in common but must not be identical sets. In other words, the two sets represent two alternative obfuscating transformations of the same original segment of code.

The term "black box obfuscating transformation" refers to an obfuscating transformation that has only basic controls over the transformation process, explicitly excluding any ability to input information about previous obfuscating transformations.

The term "white box obfuscating transformation" refers to an obfuscating transformation that has detailed control over the transformation process, explicitly including the ability to input information about previous obfuscating transformations at a fundamental block level.

The term "fake robust" refers transformations that look like real valid code but have subtle errors in them, so that if executed in response to attacks by a hacker, they appear to operate correctly, but instead introduce bugs into the program that are designed to be difficult to detect.

The term "feedback loop" describes a process that is repeated many times, and the results of the previous repetition are used to guide the next repetition towards achieving its goal. As a simple example, the standard binary search algorithm can be thought of as possessing a feedback loop. In the binary search algorithm, each iteration compares the target value with the mid-point of the range of values to check, and then the next iteration selects a new upper or lower bound based on the result of that comparison, thus homing in on the desired value. One aspect of the present invention also contains a feedback loop. The metrics provide a measure of a previous iteration, and the next iteration uses these metrics to help decide how to produce a different obfuscating transformation that may get closer to the desired goal, via techniques such as white box obfuscating transformations.

The term "obfuscation with dynamic analysis feedback" is a combination of the above terms, meaning to have a feedback loop controlling, in a preferred embodiment, the white box obfuscating transformation process. The term "dynamic analysis" refers to analysis carried out while actually running the program, in contrast to examples from the prior art that only consider static analysis of the original code.

The term "original code," and the associated "original code module" and "original module" terms, refers to files containing sets of instructions that have yet to have obfuscating transformations applied. In the preferred embodiment, the programming language for each file can be one of C, C++, or Java, but other languages may be used, even assembly language. Similarly, "obfuscated code" and "obfuscated code module" also refer to files containing sets of instructions, but after an obfuscated transformation has been applied. In the preferred embodiment, the same computer programming language or encoding is used for both the original and obfuscated modules, but as long as there is a mapping from the original module's language to the obfuscated module's language, the techniques described by this document may be applied even when the input language for an obfuscating transformation differs from the output language.

Other terms shall be introduced and defined throughout the detailed description hereafter.

Next, the preferred embodiment of the present invention shall be described with reference to the diagrams.

The obfuscation method and obfuscator in the preferred embodiment of the present invention incorporate feedback from dynamic analysis to improve the strength of the obfuscations. Hereafter, for purposes of explanation, numerous specific details are set forth in order to provide a thorough understanding of the present invention. It will be evident, however, to one of ordinary skill in the art, that the present invention may be practiced without these specific details. In addition, the description of the preferred embodiment is not intended to limit the scope of the present invention in any way.

Figure 5:
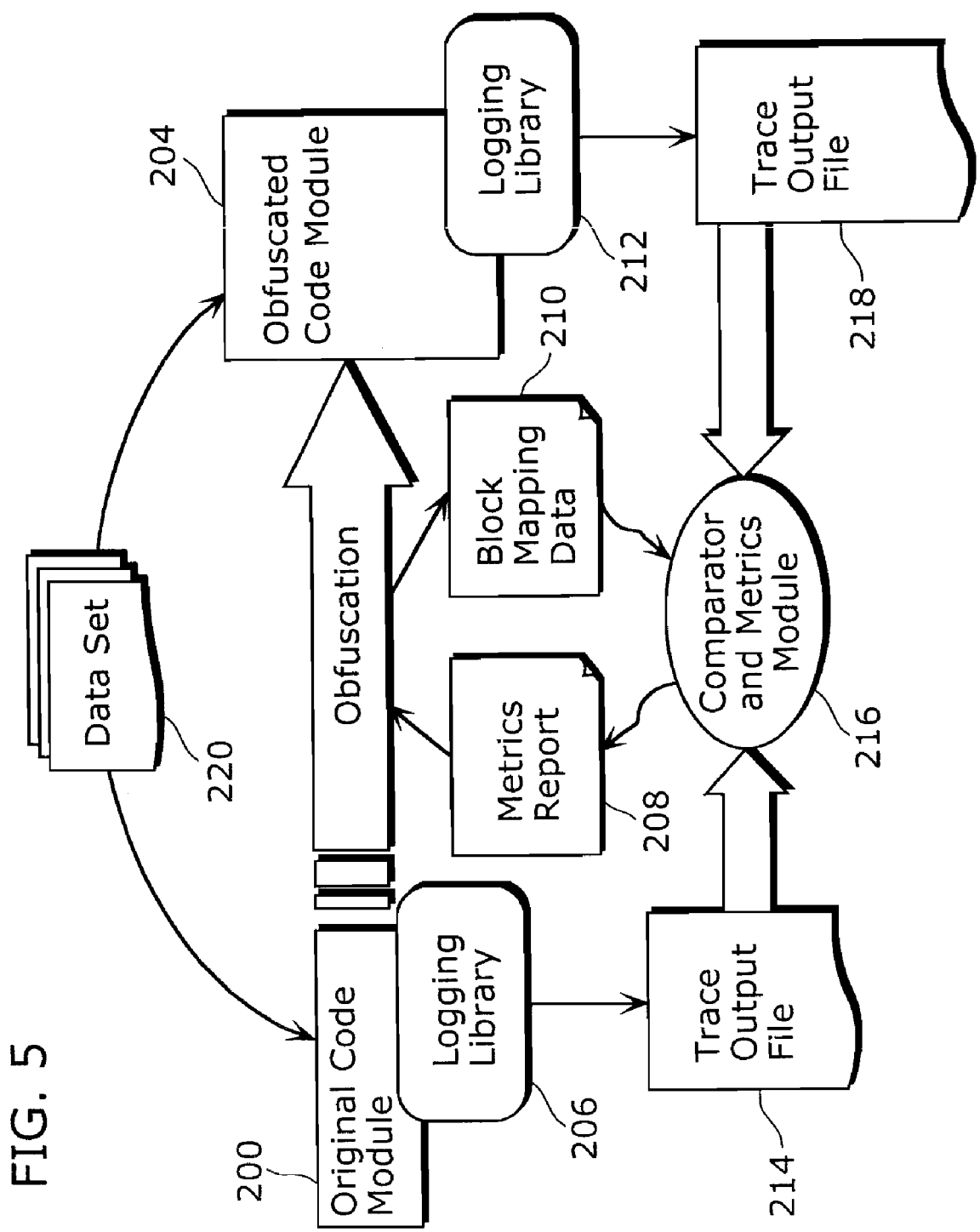
FIG. 5 is a diagram that illustrates the obfuscation method of the preferred embodiment.

FIG. 5 is a diagram that illustrates the obfuscation method of the present embodiment.

The obfuscation method in the present embodiment optimizes the obfuscation process with feedback from analysing and evaluating the output produced from running the original code module and the obfuscated code module using a logging library, as indicated in FIG. 5.

In the obfuscation method of the present embodiment, an original code module 200 is inputted into an obfuscator 202, and an obfuscated code module 204 is produced through the obfuscation process. Both the original code module 200 and the obfuscated code module 204 can be linked with their respective logging libraries 206 and 212 (in the preferred embodiment the libraries are identical, but different libraries may be used for each of the two code modules), and are run using the data set 220 as input to the tests.

The logging libraries 206 and 212 are libraries which output a code module execution log, and produce respective trace output files 214 and 218. The trace output files 214 and 218 are then taken as input and used by a comparator and metrics module 216. It should be noted that, in the present embodiment, the trace output file 218 is configured as a first unit of logging data, and the trace output file 214 is configured as a second unit of logging data.

The comparator and metrics module 216 also uses an output block mapping report 210 produced through the obfuscation process to produce a metrics report 208, which forms a white box obfuscating transformation feedback loop.

Therefore, with the obfuscation method of the present embodiment, the obfuscation process is performed based on dynamic analysis. In other words, by evaluating metrics used on the trace output file 218, which indicates the result of executing the obfuscated code module 204, it can be determined whether or not the obfuscated code module 204 has been obfuscated to the optimum degree. If it is determined that the obfuscated code module 204 has not been obfuscated to the optimum degree, the obfuscation process is caused to reflect the result of the aforementioned metrics evaluation, and is run again.

Figure 6:
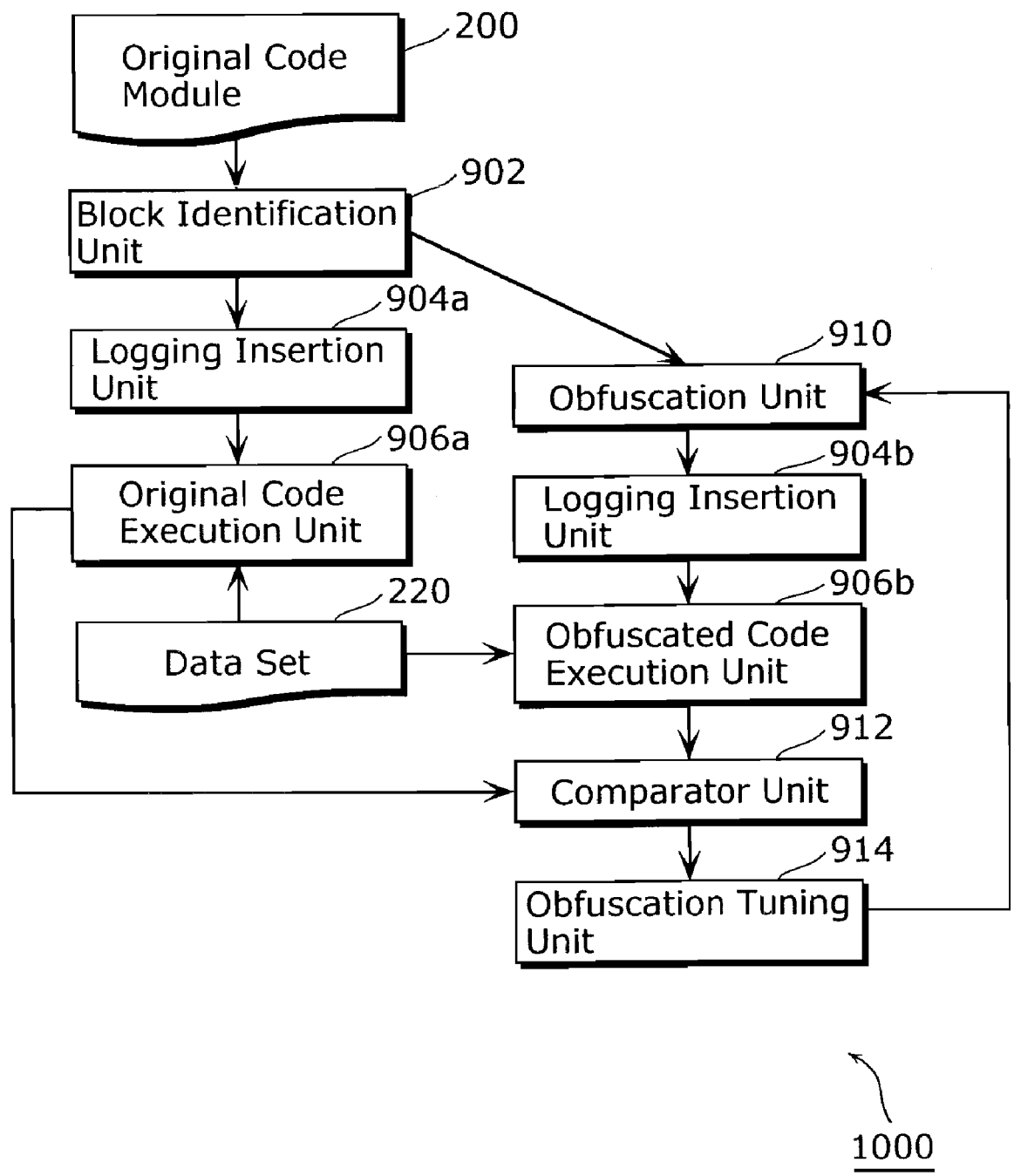
FIG. 6 is a block diagram that shows the structure of an obfuscator in the preferred embodiment.

FIG. 6 is a block diagram that shows a configuration of the obfuscator which obfuscates the original code module 200 according to the aforementioned obfuscation method with dynamic analysis.

In the present embodiment, an obfuscator 1000 includes a block identification unit 902, a logging insertion unit 904a, an original code execution unit 906a, an obfuscated code execution unit 906b, a comparator unit 912, and an obfuscation tuning unit 914.

The block identification unit 902 inserts block identifiers into the original code module 200 in order to identify each fundamental block present in the module 200.

The logging insertion unit 904a compiles the original code module 200 with the logging library 206, producing an executable program.

The original code execution unit 906a executes the program produced by the logging insertion unit 904a using the data set 220. In addition, the original code execution unit 906a further produces the trace output file 214 which shows a result of executing the program.

The obfuscation unit 910 acquires the original code module into which the block identifiers have been inserted and obfuscates the module 200, thereby producing the obfuscated code module 204. The obfuscation unit 910 performs the obfuscation in accordance with the metrics report 208 outputted by the obfuscation tuning unit 914. Furthermore, the obfuscation unit 910 performs the obfuscation on the fundamental blocks present in the original code module 200 on a block-by-block basis, and produces the block mapping report 210, which shows the correspondence between the fundamental blocks present in the original code module 210 and the blocks present in the obfuscated code module 204.

The logging insertion unit 904b compiles the obfuscated code module 204 with the logging library 212, producing an executable program.

The obfuscated code execution unit 906b executes the program produced by the logging insertion unit 904b using the data set 220. In addition, the obfuscated code execution unit 906b further produces the trace output file 218 which shows the result of executing the program. Note that that the obfuscated code execution unit 906b may be configured as an execution means in the present embodiment.

The comparator unit 912 analyzes and compares the trace output files 214 and 218 produced by the original code execution unit 906a and the obfuscated code execution unit 906b respectively, based on the aforementioned comparator and metrics module 216. In other words, the comparator unit 912 compares and evaluates the trace output files 214 and 218 based on metrics (described later) using the block mapping report 210 produced by the obfuscation unit 910. The comparator unit 912 then produces the metrics report 208 which shows the results of the comparison and evaluation.

It should be noted here that the comparator unit 912 may be configured so as to compare the trace output file 218 produced by the obfuscated code execution unit 906b with the trace output file 214 produced by the original code execution unit 906a only the first time the obfuscation unit 910 performs the obfuscation. In such a case, for each subsequent obfuscation, the comparator unit 912 compares the trace output file 218 produced in the previous obfuscation with the newly-produced trace output file 218. Alternatively, the comparator 912 may evaluate the trace output file 218 and produce a metrics report without comparing the trace output file 218 with the trace output file 214 or the trace output file 218 performed in the previous obfuscation. In this case, the comparator unit 912 may use the obfuscated code module 204 and evaluate the trace output file 218.

The obfuscation tuning unit 914 feeds back the metrics report 208 produced by the comparator unit 912 into the obfuscation unit 910. That is, when the metrics report 208 does not fall within a permissible range, or in other words, it is determined that the obfuscation is insufficient, the obfuscation tuning unit 914 feeds back that metrics report 208 into the obfuscation unit 910. Note that the obfuscation tuning unit 914 may count the number of times obfuscation has been performed by the obfuscation unit 910 and feed back the metrics report 208 into the obfuscation unit 910 when the count is less than or equal to a pre-set number. Alternatively, the obfuscation tuning unit 914 may measure the amount of time in which obfuscation has been performed and feed back the metrics report 208 into the obfuscation unit 910 when the measured time falls within a pre-set amount.

Furthermore, the obfuscation unit 910 selects, based on the metrics indicated in the metrics report 208, an obfuscation method with an improved degree of obfuscation, in other words, an obfuscation method that performs obfuscation more adequately, and obfuscation of the original code module 200 may be performed using such obfuscation method. In this case, when the degree of obfuscation does not improve despite adopting the obfuscation method with an improved degree of obfuscation, it is judged that the obfuscation is already sufficient. In other words, the obfuscation tuning unit 914 compares the degree of obfuscation identified in the immediately preceding metrics report 208 with the degree of obfuscation identified in the metrics report 208 ahead of the immediately preceding metric report. Subsequently, the obfuscation tuning unit 914 feeds back that metrics report 208 into the obfuscation unit 910 when the degree of obfuscation has improved, and does not carry out the feedback of the metrics report 208 when the degree of obfuscation has not improved.

Figure 7:
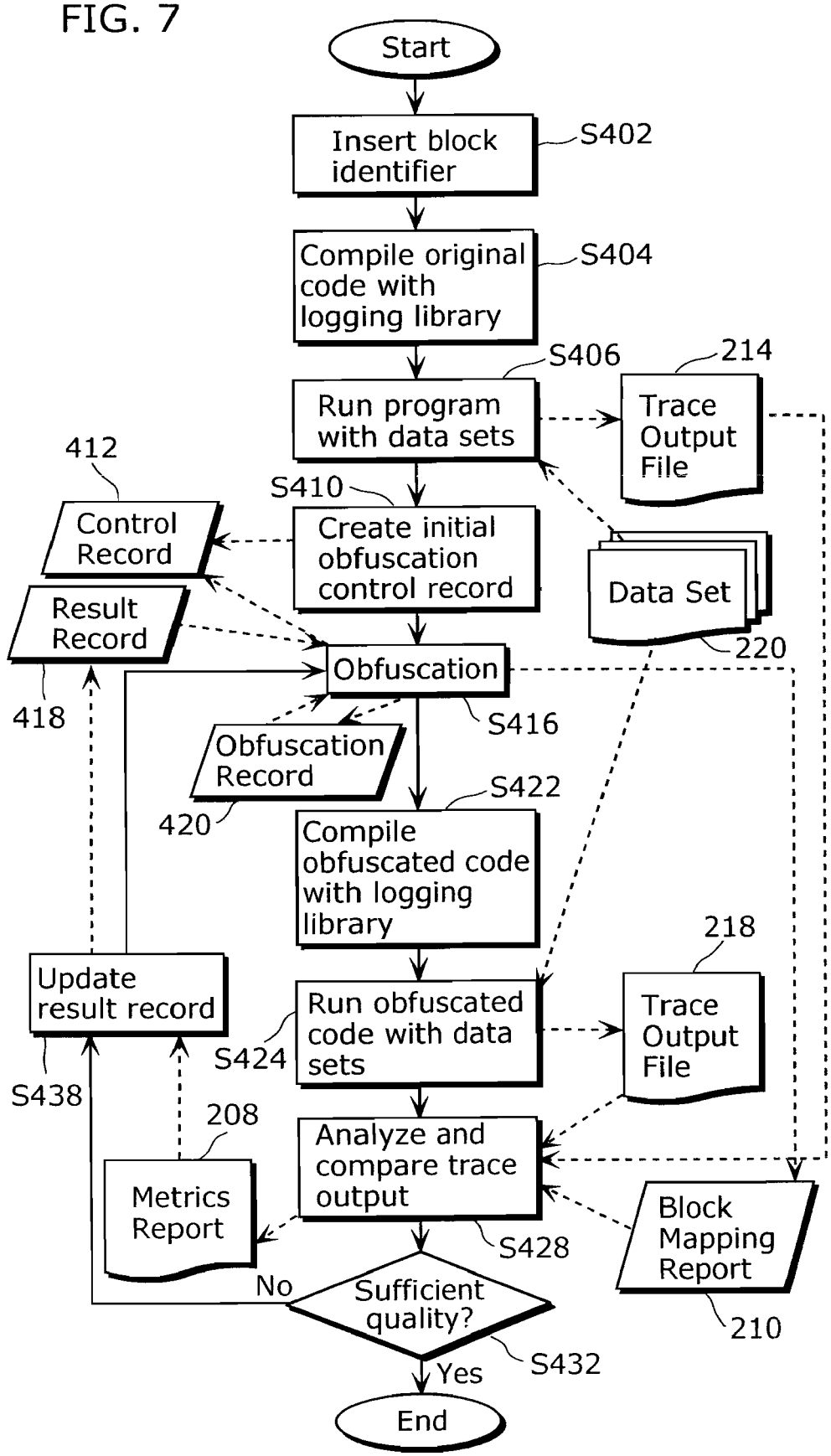
FIG. 7 is a flowchart that indicates operations of the obfuscator in the preferred embodiment.

FIG. 7 is a flowchart that indicates operations of the obfuscator 1000 in the preferred embodiment.

First, when the obfuscation with dynamic feedback starts, the block identification unit 902 of the obfuscator 1000 inserts block identifiers (S402). This process identifies the fundamental blocks within the original code module 200 to be obfuscated and analysed, and is a key step to ensuring that the analysis and comparison processes later can perform correctly.

Next, the logging insertion means 904a compiles the original code module 200 with the logging library 206 (S404). Through this compile, the original code module 200 is compiled and linked using an appropriate compiler tool set for the language of that module, and the logging library 206 is incorporated into the output executable.

The original code execution unit 906a runs the executable, which is a runnable combination of the original code module 200 and the logging library 206, with the data sets 220 (S406). It should be noted that the data sets 220 are used as input to produce the trace output file 214.

The obfuscation unit 910 creates a control record 412 for the obfuscation (S410). In other words, the obfuscation unit 910 creates a basic set of obfuscation control parameters, or the control record 412, using either values from user input or a set of predefined values. This control record 412 will play an important role in the feedback process, as will be described later.

Next, the obfuscation unit 910 performs the obfuscation (S416). Here, the obfuscation unit 910 takes the inputted original code module 200, the control record 412, the result record 418 (if present), and the obfuscation record 420 (if present), and applies one or more obfuscation techniques to the original code 200.

It should be noted here that the obfuscation techniques used may be either previously-disclosed techniques, or new yet-to-be-discovered inventions, as this invention may be adapted to cope with various obfuscation techniques.

In addition, the obfuscation unit 910 produces and stores an obfuscation record 420, which indicates the obfuscation technique employed, at the time of obfuscating the original code module 200.

When in the feedback loop, the obfuscation unit 910 refers to the obfuscation record 420. In other words, it is determined whether or not an obfuscation of a fundamental block identified via the block identifier is of a sufficient quality, and if the quality is determined to be insufficient, the obfuscation unit 910 uses the obfuscation record 420 to discover what obfuscation techniques were used in a previous obfuscation and employ a different obfuscation technique in a new obfuscation. That is, the obfuscation unit 910 selectively obfuscates part of the original code module.

When the obfuscation in step S416 finishes, the obfuscation unit 910 outputs the obfuscated code module 204 containing the transformed code. In addition, the obfuscation unit 910 is caused to reflect the newly-applied transformations (obfuscation techniques), and creates the block mapping report 210 to indicate how the fundamental blocks in the original code module 200 relate to the obfuscated fundamental blocks in the obfuscated code module 204. See the following description of FIGS. 8 through 10 for a more detailed description of the feedback loop and the files involved.

Next, the logging insertion unit 904b compiles the obfuscated code module 204 with the logging library 212 (S422). The compiling performed here is much like the compiling performed in Step S404; however, in the compiling performed in Step S422, the obfuscated code module 204 is compiled and linked using an appropriate compiler tool set for the language of that module, and the logging library 212 is incorporated into the output executable.

The obfuscated code execution unit 906b runs the executable, which is a runnable combination of the obfuscated code module 204 and the logging library 212, with the data sets 220 (S424). The data sets 220 are used as input to produce the trace output files 218.

Next, the comparator unit 912 analyzes and compares the trace output files 218 (S248). The processing performed in Step S428 is one of the key features of the present invention. In summary, the comparator unit 912 first obtains the trace output files 214 and 218 from the original code execution unit 906a and the obfuscated code execution unit 906b, and then uses the information contained within the block mapping report 210, or in other words, the information on how the fundamental blocks have been obfuscated, to produce the metrics report 208 on the quality of the obfuscation of the fundamental blocks, according to various metrics that will be described later. That is, the result of this analysis and comparison is recorded in the metrics report 208 in either a human-readable form or a computer-readable format such as Extensible Markup Language (XML) that can be transformed by one skilled in the art into a human-readable form.

The obfuscation tuning unit 914 determines whether or not the obfuscation of the obfuscated code module 204 produced in Step S416 is of sufficient quality based on the metrics report 218 produced in Step S428 (S432). In other words, the obfuscation tuning unit 914 determines whether or not to continue iterating round the feedback loop.

In the present invention, the determination whether or not to continue iterating may be based on one or more of the following factors: average score of specific metrics (such as execution speed, code size, path coverage, etc.), weighted as desired (including a weight of zero to effectively ignore certain metrics), pass a user-defined threshold (permissible range); specific metrics pass a user-defined threshold (permissible range); number of iterations performed exceed a limit (predetermined number of iterations); optimisation with feedback process execution time or memory requirements exceed a limit, and so on. Note that the determination to iterate may be made in the case where the average value of plural metrics does not fall within a permissible range without the above weighting being performed.

Furthermore, in the case of adopting an obfuscation method in which the degree of obfuscation improves with every iteration, the metrics report in the past iteration is compared with the current metrics report and, when the current degree of obfuscation has not improved, the determination not to iterate may be made.

Once the quality has been deemed sufficient in Step S432 (Yes of S432), the obfuscator 1000 terminates the obfuscation with dynamic analysis feedback process.

However, if the quality is deemed to be insufficient in Step S432 (No of S432), the obfuscation tuning unit 914 updates the obfuscation result record 418 (S438). That is, the obfuscation tuning unit 914 takes the metrics report 208 output by the comparator unit 912 in Step S428, and processes and transforms the data as necessary in order to produce the result record 418 that is used as feedback in the obfuscation in Step S416. In other words, the obfuscation tuning unit 914 produces the result record 418 by converting the format of the metrics report 208 into a format readable by the obfuscation unit 910.

In this embodiment, the above will be a simple transformation process, as analyzing and comparing trace output files in Step S428 and obfuscation in Step S416 are designed to work together.

Note that the analysis and comparison of trace output files (S428) and the obfuscation (S416) may be designed independently. In such a case, in updating the obfuscation result record 418 (S438) may need to perform more complex transformations in order to produce a result record 418 of a form suitable for input into obfuscation (S416).

Here, in FIG. 7, the obfuscation in Step S416, and three data items, or the obfuscation record 420, the control record 412, and the result record 418, are linked together to form part of the core of the dynamic analysis feedback system. Their roles within the present embodiment shall now be described.

Before the obfuscation in Step S416, there is a process for creating an initial obfuscation control record 412. This control record 412 contains a set of instructions on how to obfuscate. In the present embodiment, for zero or more fundamental blocks of code (as identified by the insertion of block identifiers (S402)) within the original code module 200 there will be an entry in the control record 412 to suggest at least the preferred obfuscation type or the preferred level of obfuscation for the block in question, as well as default values for the rest of the blocks of code.

Figure 8:
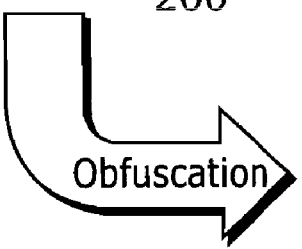
FIG. 8 is a diagram that shows examples of an original code module and an obfuscated code module in the preferred embodiment.

FIG. 8 is a diagram that shows examples of the original code module 200 and the obfuscated code module 204.

For example, an original code module 200 that includes a Block (A) is obfuscated into an obfuscated code module 204 which includes five blocks, or A0, A1, A2, A3, and A4. To put it differently, the obfuscator 1000 creates the blocks A0, A1, A2, A3, and A4.

In order to select a block from the blocks A1, A2, A3, and A4, the block A0 calls a pseudo-random number generation routine (rand_func( ) in this example). Next, the block A0 uses the return value from this call to determine which of the other blocks to execute. Note that in this example rand_func( ) returns a value between 0.0 and 1.0, so the block A4 is purposely a dummy block that should never be executed.

FIG. 9 is a diagram that shows an example of the block mapping report 210.

For example, after the obfuscation process shown in FIG. 8 is executed and completed, a block mapping report 210, such as the one shown in FIG. 9, is generated. It should be noted that formats such as XML may be used for the block mapping report 210 as long as these do not detract from the novelty of the present invention.

The contents of the block mapping report 210 includes information on how a fundamental block A of the original code module 200 has been transformed into five new fundamental blocks, namely A0 and the succeeding four parallel blocks A1, A2, A3, and A4. In the present embodiment, the syntax of the mapping illustrated in the second line of the block mapping report 200 uses "+" to indicate sequential fundamental blocks and "|" to indicate parallel fundamental blocks. Brackets can be used to produce nesting if desired, and of course other representations of the block relationships may be employed by one skilled in the art.

In other words, the block mapping report 210 shown in FIG. 9 shows that block A of the original code module 200 has been transformed into blocks A0, A1, A2, A3, and A4 in the obfuscated code module 204. The block mapping report 210 also shows which of blocks A1, A2, A3, and A4 are to be executed after block A0, and furthermore shows that block A4 is a dummy block.

Note that this information in the block mapping report 210 will also be written to the obfuscation record 420, along with other internal private detailed information as required by the obfuscation unit 910, to enable subsequent iterations round the feedback loop to determine how to enhance the obfuscations applied.

FIG. 10 is a diagram that shows an example of the metrics report 208.

In the present embodiment, the metrics report 208 illustrated in, for example, FIG. 10 is generated in the analysis and comparison of trace outputs (S428 in FIG. 7).

The contents of the metrics report 208 are based upon the block mapping report 210, a summary of the contents of the trace output files 214 and 218, and the metrics for the original code module 200 and the obfuscated code module 204.

As an example, the metrics report 208 contains the following typical contents: information on the number of executions of loops, execution path coverage, and the quality of obfuscation. One skilled in the art can extend this layout to include many other factors, which shall be described later. In addition, the metrics report 208 shows the execution path coverage or the frequency distribution of the executed paths as metrics.

FIG. 11 is a diagram that shows an example of a result record 418.

When the quality of obfuscation is judged to be insufficient in Step S432 shown in FIG. 7, the obfuscation tuning unit 914 updates the obfuscation result record 418 in the feedback loop. In other words, the obfuscation tuning unit 914 takes the metrics report 208 and translates it into a format suitable for feedback into the obfuscation process (Step S416 shown in FIG. 7).

For example, the result record 418 shown in FIG. 11 has been created based on the metrics report 208 shown in FIG. 10.

In the obfuscation process (Step S416 shown in FIG. 7), the obfuscation unit 910 attempts to re-obfuscate the original code module 200 using different techniques in accordance with the result record 418.

For example, the obfuscation unit 910 attempts to produce a more even spread of execution paths through the blocks A1, A2, A3 and A4 by choosing a different random number generation method in block A0; or, the obfuscation unit 910 rewrites the "if" statement conditions of each block with different bounds. Other methods for re-obfuscation may be employed as well.

In order to aid understanding of the above paragraphs, the sample output results in FIGS. 10 and 11 based on the analysis of the code shown in FIG. 8 shall be described in more detail.

In the analysis and comparison of trace output files (Step S428 in FIG. 7), a metrics report 208, as illustrated in FIG. 10, is produced. The metrics report 208 indicates the obfuscation method used (in this example, "random branching") and the total number of times the original fundamental block A in the original code module 200 has been executed, which is, in this example, 300 Limes. Next, each of the possible paths through the new fundamental blocks in the obfuscated code module 204 is enumerated along with the percentage number of times through each path. Note that in the analysis and comparison of trace output files (Step S428 in FIG. 7), the comparator unit obtains the information about the pre- and post-obfuscation fundamental block relationships from the block mapping report 210, illustrated in FIG. 9.

The metrics report 208 also has a quality rating (the Quality shown in FIG. 7) for the obfuscation, based on metrics calculated in the analysis and comparison of trace output files (Step S428 in FIG. 7). In the illustrated embodiment the rating is a percentage score based on weighting the results of the metrics. Note that ratings may be simple pass/fail marks. Alternatively, the ratings may be detailed lists of each metric score.

Whatever the representation of the ratings, one role of the obfuscation tuning unit 914 is to transform the ratings shown in the metrics report 208 from the format produced in the analysis and comparison of trace output files (Step S428 in FIG. 7) to the format that the obfuscation (Step S416 in FIG. 7) can understand. The obfuscation (Step S416 in FIG. 7) in the preferred embodiment expects to find, in the feedback, information on the absolute number of times each block has executed; therefore, by comparing the metrics report 208 and the result record 418, it can be seen how the format has been transformed. Of course, the result record 418 may have a different format, if such a format is required in the obfuscation (Step S416 in FIG. 7).

When the process iterates back round to the obfuscation (Step S416 in FIG. 7), the result record 418 described above is inputted into the obfuscation unit 910. The obfuscation unit 910 can use the data contained in the result record 418 to decide how to re-obfuscate the original code module 200. As described previously, the obfuscation record 420 contains sufficient information to exactly reproduce the obfuscation. Therefore, in the present embodiment, the additional information contained within the result record 418 can be used in order to produce a hopefully better-quality obfuscation. The quality will of course be verified by a subsequent execution of the analysis and comparison of trace output files (Step S428 in FIG. 7). In the present embodiment, in the result record 418 in FIG. 11, the "if" statements at the end of block A0 and block A2 may be altered in order to try to increase the relative number of executions of block A1 and block A3. Another course of action that may be taken could be to try a completely different obfuscation method, for instance.

Note that the embodiment described requires a considerable degree of tight coupling between the obfuscation (Step S416 in FIG. 7) and the updating of the result record 418 (Step S438 in FIG. 7) that is not necessary. In addition, the analysis and comparison of trace output files (Step S428 in FIG. 7) and the updating of the result record (Step S438 in FIG. 7) are similarly tightly coupled. One skilled in the art could design a set of protocols or file formats to reduce this interdependence; for instance, a standardised XML schema would provide a solid foundation.

Next, several examples of metrics used for evaluating the trace output file 218 that indicates the results of executing the obfuscated code module 204 shall be given.

(Path Coverage)

In the present embodiment, path coverage, for example, can be used as a metric.

To be more specific, the paths taken through the code after obfuscation are analyzed by calculating the number of paths through the control flow graph of the obfuscated code module 204 after transformation, then comparing the number with the number of actual paths as recorded in the trace output file 218. In a preferred embodiment this information may be used to direct the obfuscation unit 910 to produce obfuscations that contain less dead paths by, for example, deleting never-executed code from the obfuscated code module 204, or more live paths, by, for example, altering conditional values (see the discussion above of FIGS. 10 and 11 for an example of this sort of behaviour) to attempt to change the unused path into a used one. The details of how to perform this analysis shall be described hereafter.

Given the control flow graph of the obfuscated code module 204 under consideration, let $N_{path}$ be the total number of paths through the control flow graph for the module, excluding paths that go through fundamental blocks explicitly marked as dummy code in the block mapping report 210. Of course, there will be consistency checking to ensure that if a fundamental block marked in the block mapping report 210 as dummy code is not actually executed according to the information contained within the trace output file 218. Let $N_{exec}$ be the number of execution paths observed through the code from analysing the trace output file 218 for the obfuscated code module 204.

Here, the metric to measure simple path coverage, $M_{SPC}$, is specified by the following equation (equation 1):

$$M_{SPC} = \frac{N_{path}}{N_{exec}} \qquad \text{Equation 1}$$

The lower this value is, the better the spread of paths through the code.

Figure 12:
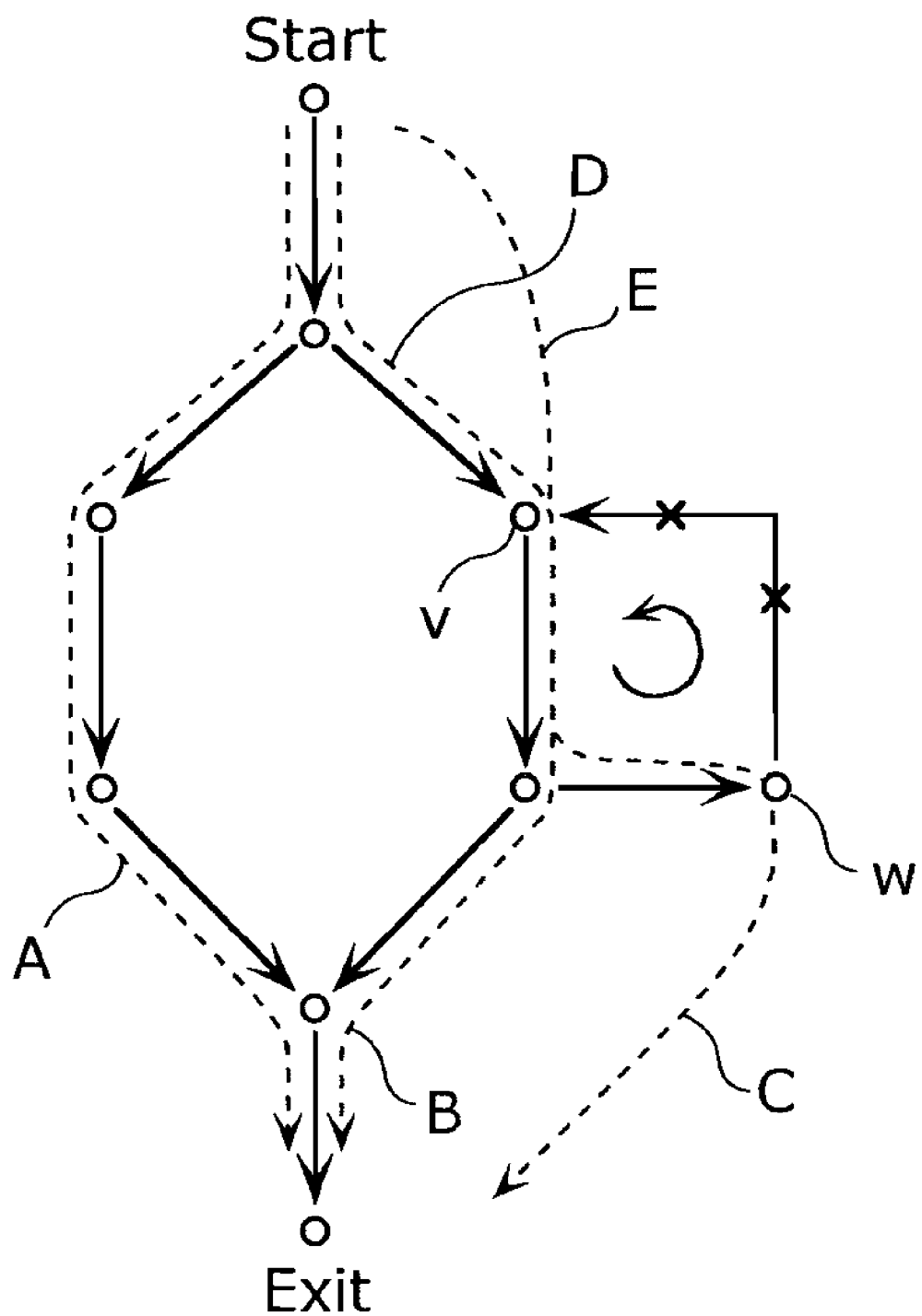
FIG. 12 is a diagram that illustrates how to count the number of paths in the preferred embodiment.

FIG. 12 is a diagram that illustrates how to count the number of paths.

The following procedure may be used when counting the number of paths, such as the aforementioned $N_{path}$, in a cyclic control flow graph that has the same Start and Exit nodes.

When counting the paths in a cyclic control flow graph with a single Start and Exit node, it must be transformed into an acyclic form by identifying the one back edge for each cycle w→v, and adding edges from Start→v and w→Exit, and then deleting the back edge.

For example, five paths can be counted in the cyclic control flow graph shown in FIG. 12; to be more specific, these countable paths are the path indicated by A, the path indicated by D→B, the path indicated by D→C, the path indicated by E→B, and the path indicated by E→C. Note that paths from the trace output file 218 that passed through any of the back edges are split into sub-paths as required.

(Change in Path Coverage)

Moreover, in the present embodiment, the change in path coverage may be used as a metric.

To be more specific, before and after obfuscation control flow graphs of the original code module 200 and the obfuscated code module 204, and before and after trace outputs 214 and 218 are taken, and how paths have changed according to the obfuscation process is identified, so that in one instance the obfuscation process can be tuned to produce more even spreads of new paths from existing paths. The details of how to perform this analysis shall be described hereafter.

Here, let the following equation (equation 2) be the number of execution paths observed through the original code module 200 from analysing the trace output file 214:

$$N_{exec}^{orig} \qquad \text{Equation 2}$$

Then, let the following equation (equation 3) be the number of execution paths observed through the obfuscated code module 204 from analysing the trace output file 218:

$$N_{exec}^{obfs} \qquad \text{Equation 3}$$

Note that in counting the paths in a cyclic control flow graph with a single Start and Exit node is performed in the same manner as has been described using FIG. 12.

Now, the metric to measure change in path coverage, $M_{CPC}$, is specified by:

$$M_{CPC} = \frac{N_{exec}^{obfs}}{N_{exec}^{orig}} \qquad \text{Equation 4}$$

The larger this value, the better the change in path coverage.

(Patterns of Execution Paths)

Furthermore, in the present embodiment, the change in path coverage may be used as a metric.

Here, the patterns of execution paths to be found in the trace output file 218 after execution, such as, for example, observing how the paths through a given loop change over time, or how regularly paths change over subsequent iterations, are evaluated.

One method of measuring these patterns of execution paths is to determine how random the paths through an obfuscated set of fundamental blocks are, by using an *Equidistribution Test* (Knuth, pg. 59) and calculating the chi-square value (Knuth pg. 39) for the observed results versus the expected theoretical values. This tells how evenly-distributed (compared to the desired distribution) the paths through the obfuscated control flow are. This test is important because if the observed execution flow passes through one code path a disproportionately large number of times, for instance, an attacker can focus efforts on that single path and perhaps uncover a large percentage of the secret information in a shorter amount of time than if there was a more even distribution of paths.

First, all the execution paths observed through the obfuscated code module 204 are collected by analysing the trace output file 214 for the obfuscated code module 204.

Note that collecting the paths is performed in the same manner as counting the paths in a cyclic control flow graph with a single Start and Exit node, as has been described using FIG. 12.

Next, the paths are then numbered using the Ball-Larus scheme for numbering paths. For zero or more specific sets of obfuscated blocks with a single dominator node, determined by analysing the block mapping report 210, first select the set of executed paths that pass through the dominator node and let the size of that set be $N_{exec}$. Next, let $N_{path}$ be the number of possible paths through the obfuscated module 204. For each distinct path Dp where $1 \leq p < N_{path}$, let $P_p$ be the expected probability of that path being executed; by default this will be, for each path Dp, the following equation (equation 5):

$$N_{exec}/N_{path} \qquad \text{Equation 5}$$

Figure 13:
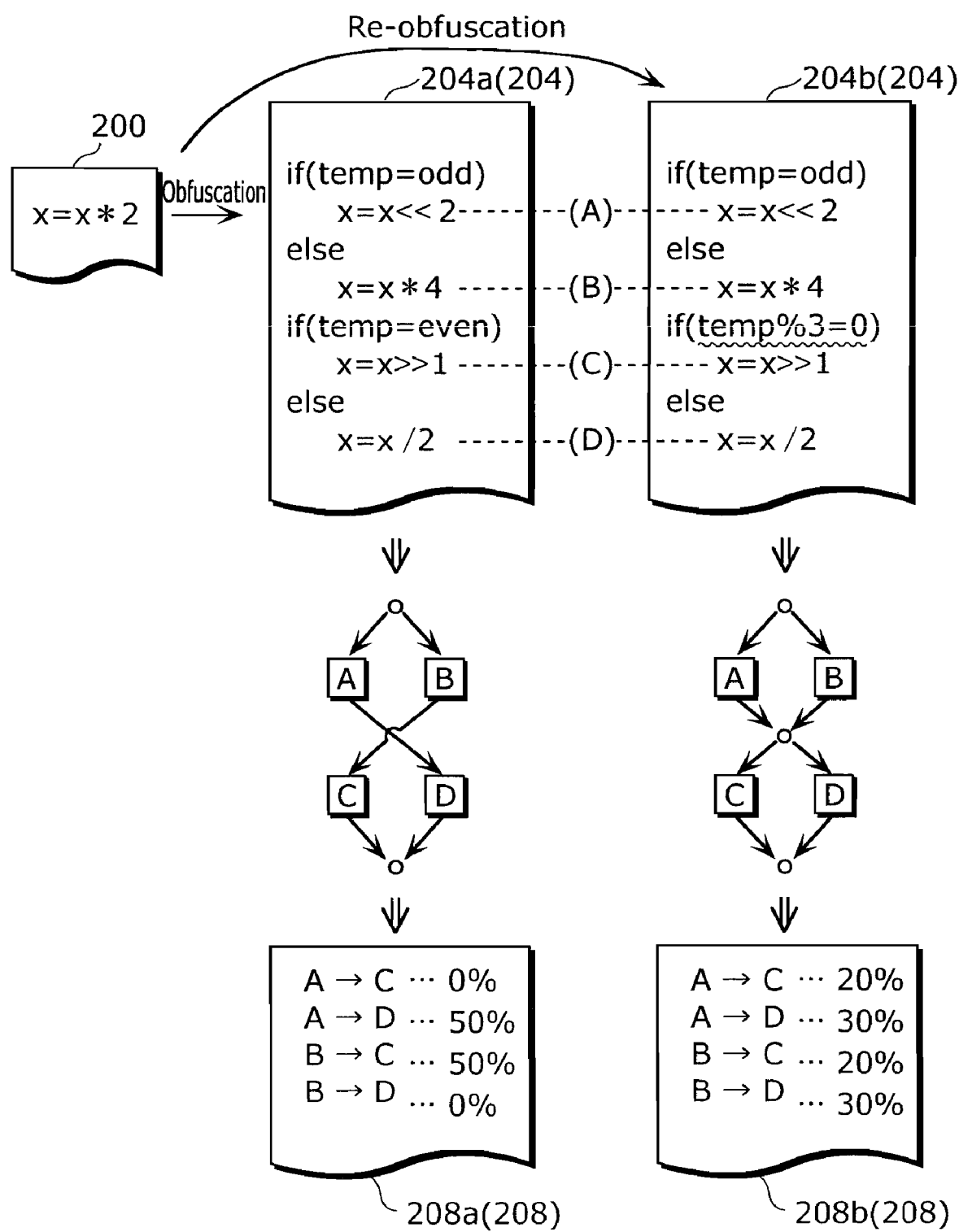
FIG. 13 is a diagram that illustrates obfuscation feedback performed based on execution path patterns in the preferred embodiment.

FIG. 13 is a diagram that illustrates obfuscation feedback performed based on execution path patterns.

The obfuscator 1000 obfuscates the original code module 200, which includes, for example, "x=x*2", where the symbol "*" indicates multiplication. As a result of this obfuscation, the obfuscator 1000 produces an obfuscated code module 204a (204) that has four blocks, or blocks A, B, C, and D.

For example, block A includes "x=x<<2"; block B includes "x=x*4"; block C includes "x=x>>1"; and block D includes "x=x/2". Note that "<<" indicates a left bit shift, while ">>" indicates a right bit shift. This means that "x=x<<2" and "x=x*4" indicate an identical process. In the same manner, "x=x>>1" indicates "x=x/2".

The obfuscator 1000 executes the produced obfuscated code module 204a, and then creates a metrics report 208a (208) that includes metrics for evaluating the patterns of the execution paths.

The percentage of paths actually executed, from among the executable paths within the obfuscated code module 204a, are denoted as metrics within this metrics report 208a.

For example, 0% for the block A→block C path, 50% for the block A→block D path, 50% for the block B→block C path, and 0% for the block B→block D path are denoted as the metrics. Note that in the obfuscated code module 204a shown in FIG. 13, the block A→block C path has no possibility of being executed; however, here, such paths shall be described as possibly being executed when judging based solely on the obfuscated code module 204a.

The obfuscator 1000 analyzes the trace output file 218a, and because the percentages of the block A→block C path and the block B→block D path are significantly lower than the expected probability $P_p$, it is deemed that the obfuscation is insufficient, and thus the obfuscation process is repeated with an increase in the percentages of these paths.

The obfuscator 1000 produces an obfuscated code module 204b (204) through the re-obfuscation. Comparing the obfuscated code module 204b with the obfuscated code module 204a produced through the previous obfuscation, it can be seen that the "if" statement between block B and block C has been changed.

In the same manner as the obfuscated code module 204a mentioned above, the obfuscated code module 204b is executed upon being produced by the obfuscator 1000. Then, the obfuscator 1000 generates a metrics report 208b (208), that includes metrics for evaluating the patterns of the execution paths.

20% for the block A→block C path, 30% for the block A→block D path, 20% for the block B→block C path, and 30% for the block B→block D path are denoted in the metrics report 208b.

The obfuscator 1000 analyzes the metrics report 208b, and because the percentages in each path are close to the expected probability $P_p$, or in other words, fall within a permissible range, the original code module 200 is deemed to have been optimally obfuscated into the obfuscated code module 204b. As a result, the obfuscator 1000 ends the obfuscation feedback process.

It should be noted that the block mapping report 210 may contain an alternative expected probability. For each distinct path $D_p$ where $1 \leq p \leq N_{path}$, let $O_p$ be the observed number of times that the path is executed. Now, perform a chi-square test to compare the observed number of times a path is taken with the expected path probability, using the following equation (equation 6) to generate the chi-square Equidistribution Test metric:

$$\chi^2_{ET} = \sum_{p=1}^{N_{path}} \frac{(O_p - P_p)^2}{P_p} \qquad \text{Equation 6}$$

The smaller the chi-square value shown in this equation is, the better the observed path distribution matches the expected path distribution, with the caveat that too low a chi-square value might in fact indicate a seemingly non-random distribution. Sample tables of the critical values of a chi-square distribution can be found in many standard statistical reference books, such as in the *NIST/SEMATECH e-Handbook of Statistical Methods*, available online at:
http://www.itl.nist.gov/div898/handbook/eda/section3/eda3674.htm Alternatively, the critical values may be computed explicitly as required.

Another method of measuring these patterns of execution paths is to determine how random the paths through an obfuscated set of fundamental blocks are, by using a *Poker Test* (Knuth pg. 62) and calculating the chi-square value for the observed results versus the expected theoretical values. This tells how well-distributed patterns in the paths through the obfuscated control flow are, according to another evaluation function different from the Equidistance Test above. This test is important because if the observed execution flow follows a regular pattern of execution, an attacker may be able to conclude that, for instance, the path selection method is just an obfuscation artifact and thus can be ignored.

To illustrate, if there were four paths a, b, c, and d, and the pattern observed was a, b, c, a, b, c, a, b, c, a, d, a, b, c, a, b, c, a, b, c, a, d, then the hacker may conclude that paths a, b, and c are chosen from the modulus remainder after division by 3 of some index value, and d is perhaps some end condition, and thus can easily divert effort from understanding the condition statement and move on to determining the real process hidden behind the obfuscations.

So, to calculate this value, first, all the execution paths observed through the obfuscated module 204 by analysing the trace output 214 for the obfuscated module 204 are collected.

Note that collecting the paths is performed in the same manner as counting the paths in a cyclic control flow graph with a single Start and Exit node, as has been described using FIG. 12.

Paths from the trace output 214 that passed through any of the back edges are split into sub-paths as required. The paths are then numbered using the Ball-Larus scheme for numbering paths, and let $N_{BL}$ be the number of unique paths identified by the Ball-Larus numbering scheme. Next, taking the paths in order in sets of k paths at a time, using the conventional k=5, count the number of unique paths numbers in each set. For instance, with 10 paths, the set of five paths {1,6,4,1,7} will have four unique entries; {1,1,2,3,3} will have three. For $0 < r \leq k$, let $O_r$ be the observed number of times that a set with r unique entries is observed. Let $P_r$ be the expected probability of that number of unique entries, calculated from the following equation (equation 7):

$$P_r = \frac{N_{BL}(N_{BL} - 1) \cdots (N_{BL} - r + 1)}{N_{BL}^k} \begin{Bmatrix} k \\ r \end{Bmatrix} \qquad \text{Equation 7}$$

Here, the Stirling Number of the Second Form (shown in equation 8) is defined by equation 9:

$$\begin{Bmatrix} k \\ r \end{Bmatrix} \qquad \text{Equation 8}$$

$$\begin{Bmatrix} k \\ r \end{Bmatrix} = \frac{1}{r!} \sum_{i=0}^{r-1} \left( (-1)^i \binom{r}{i} (r-i)^k \right) \qquad \text{Equation 9}$$

The binomial coefficient shown in equation 10 is defined by equation 11:

$$\binom{r}{i} \qquad \text{Equation 10}$$

$$\binom{r}{i} = \frac{i!}{(i-r)! r!} \qquad \text{Equation 11}$$

Now, a chi-square test is performed to compare the observed number of unique entries in all sets with the expected probability, using the following equation (equation 12) to generate the chi-square Poker Test metric:

$$\chi^2_{PT} = \sum_{p=1}^{r} \frac{(O_r - P_r)^2}{P_r} \qquad \text{Equation 12}$$

The smaller the chi-square value indicated in equation 12, the better the observed path distribution matches the expected path distribution, with the caveat that too low a chi-square value might in fact indicate a too good to be true distribution. See above for details on where to find information regarding the critical values of a chi-square distribution.

(Degree of Similarity)

In addition, a degree of similarity may be used as a metric in the present embodiment.

In other words, the degree of similarity between corresponding fundamental blocks in different paths taken by the obfuscated code module 204 are evaluated. This mapping information is obtained from the block mapping report 210 produced by the obfuscation unit 910. A high degree of similarity between different obfuscations of the same fundamental block, for instance, indicates a potentially low effectiveness of the obfuscation process. The details of how to perform this analysis shall be described hereafter.

To compare two blocks of code, either two individual fundamental blocks or two path segments built up from consecutive fundamental blocks, that implement two different representations of the same functionality in other words, a block of code that has been obfuscated by two different obfuscation methods, or the same obfuscation method but with different obfuscation parameters) the trace output files 214 or 218 for these blocks are examined and translated into an alphabet.

In other words, the trace is translated into an alphabet by representing each operation by a different code unique for each operation, and optionally representing variable references by other codes to produce two streams of data that encode the module execution trace in a string-like fashion, and further optionally representing control flow structures and other program elements by yet further codes. The Levenshtein distance between these two streams can be calculated. In the preferred embodiment, for simple encoding, where just the operations are encoded, 8-bit wide characters may suffice. For a full encoding, 32-bit wide characters may be necessary.

In other words, two path segments that share the same functionality are converted into alphabet strings, and movements, deletions, insertions, and so on occurring between these alphabet strings are detected. Based on the results of this detection, the degree of similarity between the aforementioned two path segments is set as a Levenshtein distance and accordingly as a metric.

The larger the value of this Levenshtein distance, the larger the difference between the pairs of fundamental blocks or execution paths, so the higher the score (Levenshtein distance) the better. Very low scores will indicate blocks that may need to be obfuscated again using a different technique.

Here, Levenshtein distance is a criteria for evaluating the degree of similarity of character strings. This distance is represented by the number of times the processes (replacement, transferring, deleting, or insertion) performed on one of the character strings in order to transform it to the other character string are carried out.

In the present invention, respective processes within the program code are alphabetized and lined up. By treating that program code as a character string, the degree of similarity between program codes can be calculated using the Levenshtein distance.

Figure 14:
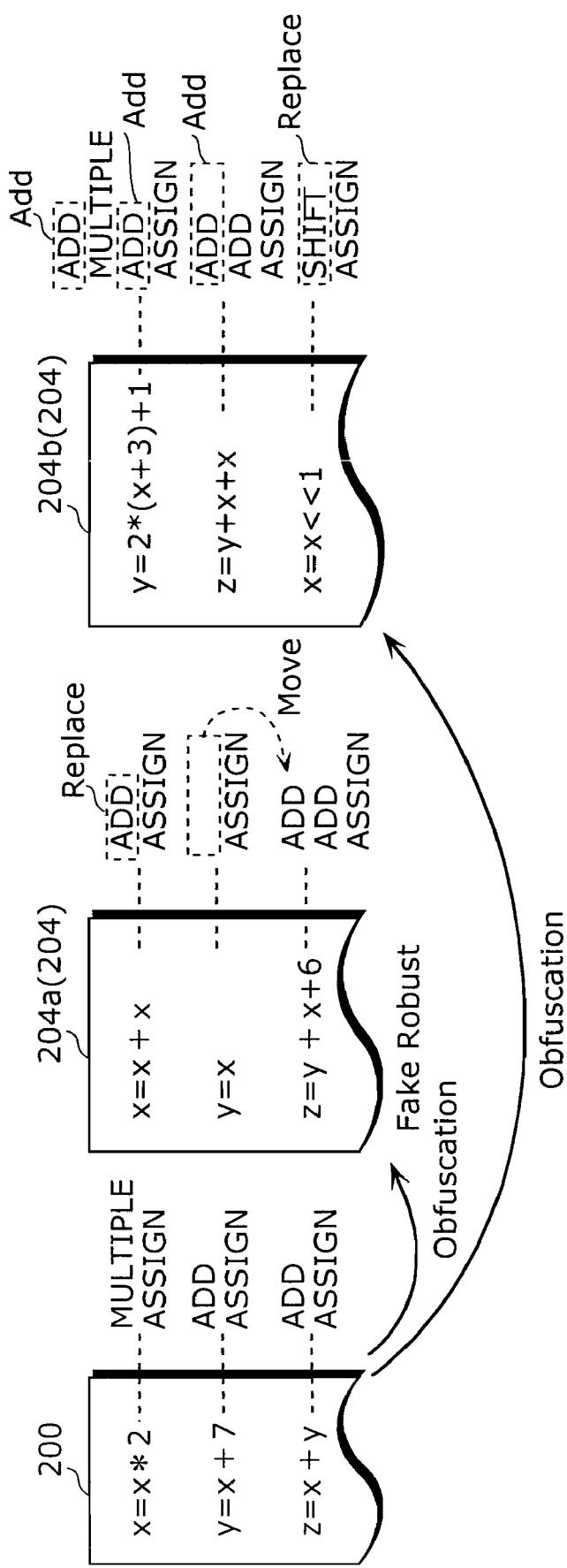
FIG. 14 is a diagram that illustrates obfuscation performed based on a degree of similarity.

For example, by assuming the alphabet "M" for multiplication the alphabet "A" for addition, and the alphabet "B" for assign, the degree of similarity of the original code module 200 and the obfuscated code module 204a shown in FIG. 14 are evaluated using the Levenshtein distance between the character strings "MBABAB" and "ABBAAB".

Note that in place of alphabet such as "M", "A", and "B", the expressions "MULTIPLE, ADD, and ASSIGN" are used in the following description for the sake of easier comprehension.

The Levenshtein distance between the trace output file 218 from the previous obfuscated code module 204 and the trace output file 218 from the presently-obfuscated code module 204 may be measured each time obfuscation feedback is performed. Alternatively, the Levenshtein distance between the trace output file 214 from the original code module 200 and the trace output file 218 from the presently-obfuscated code module 204 may be measured each time obfuscation feedback is performed. Low scores indicate a poor performance by the obfuscator 1000; in other words, low scores indicate that the obfuscation was not of sufficient quality.

Regarding dummy code and fake robust dummy code in the obfuscated code module 204, it should be noted that the lower the score the better, the reason being that the goal of generating such dummy code is to divert the hacker from the main code, and thus very similar code is a desirable outcome.

FIG. 14 is a diagram that illustrates obfuscation performed based on the degree of similarity.

The obfuscator 1000 obfuscates an original code module 200 that includes, for example, "x–x*2, y=x+7, z=x+y". As a result, the obfuscator 1000 produces an obfuscated code module 204a (204) including the fake robust "x=x+x, y=x, z=y+x+6" and an obfuscated code module 204b (204) including "y=2*(x+3)+1, z=y+X+x, x=x<<1".

Note that the trace output file 214 that indicates the result of the original code module 200 being executed shows the same contents as the original code module 200 shown in FIG. 14. Similarly, the trace output file 218 that indicates the result of the obfuscated code module 204 being executed shows the same contents as the obfuscated code module 204 shown in FIG. 14.

When such obfuscated code module 204a is produced and executed, the obfuscator 1000 compares the trace output file 218 of the obfuscated code module 204a with the trace output file 214 of the original code module 200, and uses the degree of similarity as a metric.

The obfuscator 1000 determines that the trace output file 218 from a fake robust obfuscated code module 204a has been constructed through replacing "MULTIPLE" with "ADD" in the first line of the trace output file 214 from an original code module 200 and moving "ADD" in the second line of that trace output file 214. In other words, the obfuscator 1000 produces a metric based on the one "replace" and the one "move". As a result, the obfuscator 1000 determines that the metric score is low, and thus that the obfuscated code module 204a resembles the original code module 200; that is, the obfuscator 1000 judges the obfuscation to be sufficient.

It should be noted that the obfuscated code module 204a is a fake robust code. Although the fake robust code may seem to accomplish the same function as the original code module 200, it is a code which confuses parties attempting to perform unauthorized analysis, by hiding a bug that is difficult to distinguish. Accordingly, the more the obfuscated code module 204a is similar to the original module, the more the obfuscation is rated as being satisfactory.

Alternatively, the obfuscator 1000 determines that the trace output file 218 from an obfuscated code module 204b has been constructed through adding two "ADDs" in the first line of the trace output file 214 from an original code module 200, adding one "ADD" in the second line of that trace output file 214, and re-places "ADD" with "SHIFT" in the third line of the trace output file 214. In other words, the obfuscator 1000 produces a metric based on the three "adds" and the one "replace". As a result, the obfuscator 1000 determines that the metric score is high, and thus that the obfuscated code module 204b does not resemble the original code module 200; that is, the obfuscator 1000 judges the obfuscation to be sufficient.

The goal of the obfuscated code module 204b is to realize the same functions as the original code module 200. As such, in order to make the analysis by an unauthorized analyzing party difficult, it is preferrable to make the obfuscated code module 204b look as if it is different from the original code module 200. As such, the more the obfuscated code module 204b is dissimilar to the original module, the more the obfuscation is rated as being satisfactory.

In this manner, the obfuscator 1000 ends the obfuscation feedback process when it judges the obfuscation to be sufficient.

(Code Size and Execution Speed)

Furthermore, in the present embodiment, code size and execution speed may be used as a metric.

When using code size and the like as a metric, there are other ways of measuring performance that are much simpler and more direct than using the complex metrics defined above. For example, the code execution speed before and after the obfuscation can be evaluated. This performance measurement is not just at the overall module granularity, but instead, each individual fundamental block transformation can be measured, thus gaining much finer performance tuning over methods suggested by the prior art. Similarly, code size can measure the size of the actually executed code, not just the size of the obfuscated code module 204, active and dead code included.

In this manner, in the present embodiment, it is possible to evaluate the trace output file 218 with all types of metrics and produce the metrics report 208; in addition, the metrics report 208, which includes plural types of metrics, may be produced.

Note that when plural types of metrics are included in the metrics report 208, these metrics may be averaged, or the metrics weighted and averaged, and a representative metric calculated thereby. In such a case, the obfuscation with feedback ends when that representative metric falls within a permissible range, and the obfuscated code module 204 corresponding to that representative metric is judged to have the highest obfuscation quality, and is thus determined to be the optimum module.

It should be noted that, as mentioned above, the obfuscation tuning unit 914 measures the number of obfuscations or the amount of time used in obfuscation, and when that number or time is below a set number of times or set amount of time, the obfuscation tuning unit 914 may feed the metrics report 208 back into the obfuscation unit 910. In this case, the obfuscated code module 204 that corresponds to the metrics that indicate the highest-quality obfuscation may be selected from among the generated obfuscated code modules 204 as the optimum module with the highest obfuscation quality.

It should be noted that although the present invention is described based on the aforementioned embodiment, the present invention is obviously not limited to such embodiment. The following cases are also included in the present invention.

(1) Each of the aforementioned apparatuses is, specifically, a computer system including a microprocessor, a ROM, a RAM, a hard disk unit, a display unit, a keyboard, a mouse, and the so on. A computer program is stored in the RAM or the hard disk unit. The respective apparatuses achieve their functions through the microprocessor's operation according to the computer program. Here, the computer program is configured by combining plural instruction codes indicating instructions for the computer.

(2) A part or all of the constituent elements constituting the respective apparatuses may be configured from a single System-LSI (Large-Scale Integration). The System-LSI is a super-multi-function LSI manufactured by integrating constituent units on one chip, and is specifically a computer system configured by including a microprocessor, a ROM, a RAM, and so on. A computer program is stored in the RAM. The System-LSI achieves its function through the microprocessor's operation according to the computer program.

Furthermore, each unit of the constituent elements configuring the respective apparatuses may be made as an individual chip, or as a single chip to include a part or all thereof.

Furthermore, here, LSI is mentioned, but there are instances where, due to a difference in the degree of integration, the designations IC, LSI, super LSI, and ultra LSI are used. Furthermore, the means for circuit integration is not limited to an LSI, and implementation with a dedicated circuit or a general-purpose processor is also possible. In addition, it is also acceptable to use a Field Programmable Gate Array (FPGA) that is programmable after the LSI has been manufactured, and a reconfigurable processor in which connections and settings of circuit cells within the LSI are reconfigurable.

Furthermore, should integrated circuit technology that replaces LSI appear through progress in semiconductor technology or other derived technology, that technology can naturally be used to carry out integration of the constituent elements. Application of biotechnology is also a possibility.

(3) A part or all of the constituent elements constituting the respective apparatuses may be configured as an IC card which can be attached and detached from the respective apparatuses or as a stand-alone module. The IC card or the module is a computer system configured from a microprocessor, a ROM, a RAM, and the so on. The IC card or the module may also be included in the aforementioned super-multi-function LSI. The IC card or the module achieves its function through the microprocessor's operation according to the computer program. The IC card or the module may also may also tamper-resistant.

(4) The present invention, may be a computer program for realizing the previously illustrated method, using a computer, and may also be a digital signal including the computer program.

Furthermore, the present invention may also be realized by storing the computer program or the digital signal in a computer readable recording medium such as a flexible disc, a hard disk, a CD-ROM, an MO, a DVD, a DVC-ROM, a DVD-RAM, a BD (Blu-ray Disc), and a semiconductor memory. Furthermore, it may also be the digital signal recorded in these recording media.

Furthermore, the present invention may also be realized by the transmission of the aforementioned computer program or digital signal via a telecommunication line, a wireless or wired communication line, a network represented by the Internet, a data broadcast, and so on.

The present invention may also be a computer system including a microprocessor and a memory, in which the memory stores the aforementioned computer program and the microprocessor operates according to the computer program.

Furthermore, by transferring the program or the digital signal by recording onto the aforementioned recording media, or by transferring the program or digital signal via the aforementioned network and the like, execution using another independent computer system is also made possible Although only one exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

The obfuscation evaluation method and obfuscation method of the present invention has the effected of sufficiently evaluating an obfuscation and effectively preventing a hacker from deciphering a program, and thus is applicable in obfuscators which obfuscate software application programs and so on.

The invention claimed is:

1. An obfuscation method for obfuscating a program using a processor, said obfuscation method comprising:
   an obfuscation step of generating, using the processor, an obfuscated code by obfuscating original code of the program;
   a first execution step of executing the obfuscated code generated in said obfuscation step;
   a first logging step of generating first logging data by logging execution details of said first execution step;
   an evaluation step of evaluating the first logging data, thereby identifying a degree of obfuscation of the obfuscated code; and
   a re-obfuscation step of re-obfuscating the original code based on a result of the evaluation performed in said evaluation step.

2. The obfuscation method according to claim 1, further comprising:
   a second execution step of executing the original code; and
   a second logging step of generating second logging data by logging execution details of said second execution step,
   wherein in said evaluation step, the first logging data is compared with the second logging data and evaluated.

3. The obfuscation method according to claim 2,
   wherein in said obfuscation step, fundamental blocks present in the original code are obfuscated and block mapping information is produced, the block mapping information indicating a correspondence between the fundamental blocks of the original code and the fundamental blocks of the obfuscated code, and
   wherein in said evaluation step, the first logging data is evaluated per corresponding fundamental block using the block mapping information.

4. The obfuscation method according to claim 3,
   wherein in said re-obfuscation step, a block of the original code is selected based on a result of the evaluation in said evaluation step, and the selected block is re-obfuscated.

5. The obfuscation method according to claim 1,
   wherein in said obfuscation step, control information that includes obfuscation parameters is used, and the original code is obfuscated in accordance with the parameters.

6. The obfuscation method according to claim 1,
   wherein in said evaluation step, evaluation result data, which indicates a result of evaluating the first logging data, is generated in a format that is readable in said re-obfuscation step.

7. The obfuscation method according to claim 1,
   wherein in said evaluation step, evaluation result data, which indicates a result of evaluating the first logging data, is generated, and the format of the evaluation result data is converted into a format that is readable in said re-obfuscation step.

8. The obfuscation method according to claim 1,
   wherein in said evaluation step, a numerical value, which is an indicator of the degree of obfuscation, is calculated as a metric, based on the first logging data.

9. The obfuscation method according to claim 8, further comprising
   a metric judgment step of judging whether or not the metric calculated in said evaluation step is within a permissible range,
   wherein each time the metric is judged as not being within the permissible range in said metric judgment step, (i) new obfuscated code is generated by re-obfuscating the original code in said re-obfuscation step, and (ii) said first execution step, said first logging step, said evaluation step, and said metric judgment step are repeated for the new obfuscated code, and
   wherein when the metric is judged as being within the permissible range in said metric judgment step, the original code is not re-obfuscated in said re-obfuscation step.

10. The obfuscation method according to claim 9,
    wherein in said evaluation step, an average value of plural numerical values, which are indicators of the degree of obfuscation, is calculated as the metric, based on the first logging data.

11. The obfuscation method according to claim 9,
    wherein in said evaluation step, plural numerical values, which are indicators of the degree of obfuscation, are weighted, and an average of the weighted plural numerical values is calculated as the metric, based on the first logging data.

12. The obfuscation method according to claim 1, further comprising
    a number judgment step of judging whether or not the number of times obfuscation has been performed on the original code has exceeded a pre-set number of times,
    wherein each time it is judged that the pre-set number of times has not been exceeded in said number judgment step, (i) new obfuscated code is generated by re-obfuscating the original code in said re-obfuscation step, and (ii) said first execution step, said first logging step, said evaluation step, and said number judgment step are repeated for the new obfuscated code, and
    wherein when it is judged that the pre-set number of times has been exceeded in said number judgment step, the original code is not re-obfuscated in said re-obfuscation step.

13. The obfuscation method according to claim 1, further comprising
    a time judgment step of judging whether or not the amount of time required for performing obfuscation on the original code has exceeded a pre-set amount of time,
    wherein each time it is judged that the pre-set amount of time has not been exceeded in said time judgment step, (i) new obfuscated code is generated by re-obfuscating the original code in said re-obfuscation step, and (ii) said first execution step, said first logging step, said evaluation step, and said time judgment step are repeated for the new obfuscated code, and
    wherein when it is judged that the pre-set amount of time has been exceeded in said time judgment step, the original code is not re-obfuscated in said re-obfuscation step.

14. The obfuscation method according to claim 1,
    wherein said first execution step, said first logging step, and said evaluation step are repeated for a new obfuscated code generated by the re-obfuscating in said re-obfuscation step, and
    wherein said obfuscation method further comprises
       a continuance step of comparing a degree of obfuscation identified in an immediately preceding evaluation step with a degree of obfuscation identified in an obfuscation step ahead of said immediately preceding evaluation step, and repeating said steps from said re-obfuscation step, based on the a result of the comparison.

15. An obfuscation apparatus for obfuscating a program, comprising at least one processor configured to operate as:
    an obfuscation unit operable to generate an obfuscated code by obfuscating original code of the program;

an execution unit operable to execute the obfuscated code generated by said obfuscation unit;

a logging unit operable to generate logging data by logging execution details of said execution unit;

an evaluation unit operable to evaluate the logging data, thereby identifying a degree of obfuscation of the obfuscated code; and a re-obfuscation unit operable to re-obfuscate the original code based on a result of the evaluation performed by said evaluation unit.

16. A non-transitory storage medium having stored thereon an obfuscation program for obfuscating a program, wherein, when executed, said obfuscation program causes a computer to perform a method comprising:

an obfuscation step of generating an obfuscated code by obfuscating original code of the program;

an execution step of executing the obfuscated code generated in said obfuscation step;

a logging step of generating logging data by logging execution details of said execution step;

an evaluation step of evaluating the logging data, thereby identifying a degree of obfuscation of the obfuscated code; and a re-obfuscation step of re-obfuscating the original code based on a result of the evaluation performed in said evaluation step.

17. An integrated circuit for obfuscating a program, comprising at least one processor configured to operate as:

an obfuscation unit operable to generate an obfuscated code by obfuscating original code of the program;

an execution unit operable to execute the obfuscated code generated by said obfuscation unit;

a logging unit operable to generate logging data by logging execution details of said execution unit;

an evaluation unit operable to evaluate the logging data, thereby identifying a degree of obfuscation of the obfuscated code; and a re-obfuscation unit operable to re-obfuscate the original code based on a result of the evaluation performed by said evaluation unit.

* * * * *